United States Patent
Choi et al.

(10) Patent No.: US 11,601,615 B2
(45) Date of Patent: Mar. 7, 2023

(54) DISPLAY APPARATUS AND CONTROL METHOD THEREOF

(71) Applicant: Samsung Electronics Co., Ltd., Suwon-si, Gyeonggi-do (KR)

(72) Inventors: Eunseok Choi, Suwon-si (KR); Joonhyun Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/587,661

(22) Filed: Sep. 30, 2019

(65) Prior Publication Data

US 2020/0344439 A1    Oct. 29, 2020

(30) Foreign Application Priority Data

Apr. 26, 2019 (KR) .......... 10-2019-0049036
Sep. 4, 2019 (KR) .......... 10-2019-0109420

(51) Int. Cl.
- *H04N 5/655* (2006.01)
- *H04N 5/44* (2011.01)
- *H04N 21/422* (2011.01)

(52) U.S. Cl.
CPC ....... *H04N 5/655* (2013.01); *H04N 21/42204* (2013.01)

(58) Field of Classification Search
CPC ............. H04N 5/655; H04N 21/42204; H04N 5/64–655; G09G 2300/04; G09G 2320/068; G09G 2320/0693; G09G 2320/08; G09G 2380/00; G09G 2354/00; G09G 2356/00; F16M 11/00;
(Continued)

(56) References Cited

U.S. PATENT DOCUMENTS 6,897,882 B1 * 5/2005 Kim .......... G09G 5/36
345/649
7,304,838 B2  12/2007 Kumano et al.
(Continued)

FOREIGN PATENT DOCUMENTS

CN    1921023     2/2007
CN    201282523 Y  7/2009
(Continued)

OTHER PUBLICATIONS

Japanese Office Action for Japanese Patent Application No. 2021-536706 dated Nov. 5, 2021.
(Continued)

*Primary Examiner* — John W Miller
*Assistant Examiner* — Humam M Satti
(74) *Attorney, Agent, or Firm* — Staas & Halsey LLP

(57) ABSTRACT

A display apparatus includes: a display; a motor configured to rotate the display; a sensor configured to sense rotation of the display; and a processor configured to output a driving signal for rotating the display in a first direction to the motor when an event for rotating the display from a first posture to a second posture occurs and output a driving signal for rotating the display in a second direction to the motor when it is identified that the display collides with an object on the basis of the driving signal output to the motor and a signal received from the sensor while the display rotates.

20 Claims, 19 Drawing Sheets

(58) Field of Classification Search
CPC ....... F16M 11/04; F16M 11/045–2085; F16M 11/18; F16M 11/22; F16M 11/10; F16M 11/06; F16M 2200/021; F16M 2200/025; F16M 11/105; F16P 3/12; G06F 1/1601; G06F 1/182; G06F 3/0482; G06F 3/0488; G09F 9/30; G09F 19/02
See application file for complete search history.

(56) References Cited

U.S. PATENT DOCUMENTS

| | | | |
|---|---|---|---|
| 7,499,267 | B2 | 3/2009 | Kumano et al. |
| 8,023,049 | B2 | 9/2011 | Ueno |
| 8,553,149 | B2* | 10/2013 | Ansfield ............... H04N 5/64 |
| | | | 348/569 |
| 8,991,951 | B2 | 3/2015 | Lee et al. |
| 9,628,744 | B2* | 4/2017 | Phang ............... H04N 5/64 |
| 10,228,766 | B2 | 3/2019 | Bhesania et al. |
| 10,587,903 | B2 | 3/2020 | Park et al. |
| 2003/0202003 | A1* | 10/2003 | Marmaropoulos ... G06F 1/1601 |
| | | | 715/710 |
| 2005/0276164 | A1* | 12/2005 | Amron ............... G04C 3/002 |
| | | | 368/82 |
| 2006/0290687 | A1 | 12/2006 | Takaji et al. |
| 2007/0047187 | A1 | 3/2007 | Kumano et al. |
| 2007/0056697 | A1 | 3/2007 | Chen |
| 2008/0055835 | A1 | 3/2008 | Kumano et al. |
| 2008/0117342 | A1 | 5/2008 | Ueno |
| 2008/0136610 | A1 | 6/2008 | Limin et al. |
| 2008/0316689 | A1 | 12/2008 | Moscovitch |
| 2009/0225239 | A1* | 9/2009 | Osada ............... H04R 1/028 |
| | | | 348/841 |
| 2009/0272870 | A1* | 11/2009 | Asakura ............... F16M 11/10 |
| | | | 248/550 |
| 2010/0014238 | A1* | 1/2010 | Zende ............... G06F 1/162 |
| | | | 361/679.22 |
| 2010/0061041 | A1* | 3/2010 | Chen ............... F16M 11/105 |
| | | | 361/679.01 |
| 2010/0149438 | A1* | 6/2010 | Chen ............... F16M 11/10 |
| | | | 348/836 |
| 2010/0248796 | A1* | 9/2010 | Higashigawa ...... H04M 1/0237 |
| | | | 455/575.4 |
| 2011/0037866 | A1* | 2/2011 | Iwamoto ............ H04N 5/23219 |
| | | | 348/222.1 |
| 2011/0079685 | A1 | 4/2011 | Kwak |
| 2011/0253866 | A1 | 11/2011 | Maeda et al. |
| 2012/0067149 | A1* | 3/2012 | Yoon ............... F16M 11/08 |
| | | | 74/414 |
| 2012/0158187 | A1 | 6/2012 | Shin |
| 2012/0175480 | A1* | 7/2012 | Lee ............... F16M 11/18 |
| | | | 248/295.11 |
| 2012/0300134 | A1* | 11/2012 | Slowinski .......... F16M 11/2092 |
| | | | 348/734 |
| 2013/0026889 | A1 | 1/2013 | Lee et al. |
| 2014/0192271 | A1* | 7/2014 | Westerink .......... B64D 11/0015 |
| | | | 348/837 |
| 2015/0172567 | A1* | 6/2015 | Ekeroth ............... H04N 5/332 |
| | | | 348/82 |
| 2015/0192929 | A1 | 7/2015 | Rihn et al. |
| 2015/0248157 | A9 | 9/2015 | Touma et al. |
| 2016/0129595 | A1 | 5/2016 | Gerio et al. |
| 2016/0202089 | A1 | 7/2016 | Leoncavallo et al. |
| 2016/0267887 | A1 | 9/2016 | Noda |
| 2017/0038845 | A1* | 2/2017 | Chi ............... H04B 1/385 |
| 2017/0218676 | A1 | 8/2017 | Kitou |
| 2018/0240252 | A1 | 8/2018 | Lee |
| 2019/0050964 | A1 | 2/2019 | Jang et al. |
| 2019/0193644 | A1 | 6/2019 | Amano et al. |
| 2019/0317549 | A1* | 10/2019 | Gurr ............... F16M 11/105 |
| 2019/0333479 | A1 | 10/2019 | Maalouf et al. |
| 2020/0026419 | A1 | 1/2020 | Jang et al. |
| 2020/0050185 | A1 | 2/2020 | Shimotsuma |
| 2020/0225696 | A1 | 7/2020 | Patel et al. |
| 2020/0292924 | A1* | 9/2020 | Amano ............... H04N 9/3102 |
| 2020/0344439 | A1 | 10/2020 | Choi et al. |
| 2020/0367646 | A1 | 11/2020 | Cho |
| 2021/0049984 | A1 | 2/2021 | Cain |

FOREIGN PATENT DOCUMENTS

| | | |
|---|---|---|
| CN | 103323517 | 12/2015 |
| CN | 106601171 A | 4/2017 |
| CN | 108766232 | 11/2018 |
| CN | 108953911 | 12/2018 |
| EP | 1821173 | 8/2007 |
| JP | 2005-109626 | 4/2005 |
| JP | 2007-295379 | 11/2007 |
| JP | 4259971 | 4/2009 |
| JP | 2013-211714 A | 10/2013 |
| KR | 10-2006-0121368 | 11/2006 |
| KR | 10-0803750 | 2/2008 |
| KR | 10-0813514 | 3/2008 |
| KR | 10-2008-0057019 | 6/2008 |
| KR | 10-2008-0057046 | 6/2008 |
| KR | 10-0860301 | 9/2008 |
| KR | 10-2010-0045374 | 5/2010 |
| KR | 10-0961772 | 6/2010 |
| KR | 10-0985223 | 10/2010 |
| KR | 10-2011-0038559 | 4/2011 |
| KR | 10-2011-0075887 | 7/2011 |
| KR | 10-1276244 | 6/2013 |
| KR | 10-2014-0008796 | 1/2014 |
| KR | 10-1766821 | 8/2017 |
| KR | 10-2017-0118318 | 10/2017 |
| KR | 10-2018-0057473 | 5/2018 |
| KR | 10-2019-0017614 | 2/2019 |
| KR | 10-2020-0134869 | 12/2020 |
| KR | 10-2021-0100298 A | 8/2021 |
| WO | 01/28822 | 4/2001 |

OTHER PUBLICATIONS

Chinese Office Action dated Apr. 30, 2021 in Chinese Patent Application No. 201910857957.0.
International Search Report and Written Opinion of the International Searching Authority dated Mar. 9, 2021 in International Patent Application No. PCT/KR2020/016337.
International Search Report and Written Opinion of the International Searching Authority dated May 20, 2021 in International Patent Application No. PCT/KR2021/001391.
Indian Office Action dated Mar. 4, 2022 in Indian Patent Application No. 202117024197 (6 pages).
Extended European Search Report dated Apr. 29, 2020 in European Patent Application No. 19200605.4.
Korean Notice of Allowance dated May 28, 2020 in Korean Patent Application No. 10-2019-0109420.
International Search Report and Written Opinion of the International Searching Authority dated Jan. 31, 2020 in International Patent Application No. PCT/KR2019/012700.
Korean Office Action dated Jan. 20, 2020 in Korean Patent Application No. 10-2019-0109420.
Office Action dated Jun. 8, 2022 in U.S. Appl. No. 17/137,619 (57 pages).
Office Action dated Dec. 1, 2022 in U.S. Appl. No. 17/137,619 (43 pages).

* cited by examiner

DISPLAY APPARATUS AND CONTROL METHOD THEREOF

CROSS-REFERENCE TO RELATED APPLICATIONS

This application is based on and claims priority under 35 U.S.C. § 119 to Korean Patent Application No. 10-2019-0049036, filed on Apr. 26, 2019, in the Korean Intellectual Property Office and Korean Patent Application No. 10-2019-0109420, filed on Sep. 4, 2019, in the Korean Intellectual Property Office, the disclosures of which are incorporated by reference herein in their entirety.

BACKGROUND

1. Field

Apparatuses and methods consistent with the disclosure relate to a display apparatus and a control method thereof, and more particularly, to a rotatable display apparatus, and a control method thereof.

2. Description of the Related Art

Recently, with the development of an electronic technology, various electronic apparatuses have been developed. In particular, recently, a rotatable display apparatus has been developed.

In the rotatable display apparatus, when a user command for rotation is input, a display disposed in a horizontal state may be rotated to a vertical state or a display disposed in a vertical state may be rotated to a horizontal state.

However, in a case where the display apparatus rotates during a period in which a person or an object is positioned within a rotation radius of the display apparatus, the display apparatus may collide with the person or the object.

In this case, the rotation of the display apparatus needs to be stopped. The reason is that when the display apparatus rotates, there is a risk that a user colliding with the display apparatus will be injured and there is a risk that the object colliding with the display apparatus or the display apparatus will be damaged.

SUMMARY

Additional aspects will be set forth in part in the description which follows and, in part, will be apparent from the description, or may be learned by practice of the presented embodiments.

Embodiments of the disclosure overcome the above disadvantages and other disadvantages not described above. Also, the disclosure is not required to overcome the disadvantages described above, and an embodiment of the disclosure may not overcome any of the problems described above.

The disclosure provides a display apparatus of which rotation is stopped and in which a display returns to a state before being rotated, in a case where the display apparatus collides with an object, and a control method thereof.

According to an embodiment of the disclosure, a display apparatus includes: a display; a motor configured to rotate the display; a sensor configured to sense rotation of the display; and a processor configured to output a driving signal for rotating the display in a first direction to the motor when an event for rotating the display from a first posture to a second posture occurs and output a driving signal for rotating the display in a second direction to the motor when it is identified that the display collides with an object on the basis of the driving signal output to the motor and a signal received from the sensor while the display rotates.

The processor may sequentially output first pulse signals for rotating the display in the first direction to the motor when the event occurs, and the sensor may output second pulse signals to the processor whenever the display rotates by a predetermined angle.

The processor may identify that the display collides with the object in a case where a relationship between the number of first pulse signals output to the motor and the number of second pulse signals output from the sensor does not satisfy a predetermined relationship, and the predetermined relationship may be determined on the basis of a ratio between the number of first pulse signals required to rotate the display from the first posture to the second posture and the number of second pulse signals that are to be output from the sensor depending on a rotation angle of the display in a case where the display rotates from the first posture to the second posture.

The display apparatus may further include a switch, wherein the processor outputs first pulse signals of which the number corresponds to a rotation angle by which the display is to rotate to the motor from a point in time at which the switch is turned on, to allow the switch to be pressed by a degree by which the switch is pressed before the event occurs, when the switch is turned on according to the rotation of the display in the second direction.

The first posture may be perpendicular to the second posture, and the switch may include: a first switch pressed in a state where the display is in the first posture; and a second switch pressed in a state where the display is in the second posture.

The processor may output a first driving signal for rotating the display to the first posture to the motor from after the first switch is pressed, when the first switch is pressed according to the rotation of the display in the second direction, after a first event for rotating the display from the first posture to the second posture occurs in a state where the first switch is pressed on the basis of the display of the first posture, and output a second driving signal for rotating the display to the second posture to the motor from after the second switch is pressed, when the second switch is pressed according to the rotation of the display in the first direction, after a second event for rotating the display from the second posture to the first posture occurs in a state where the second switch is pressed on the basis of the display of the second posture.

The processor may control a rotation speed of the display during the rotation of the display in the second direction to be relatively slower than that of the display during the rotation of the display in the first direction.

The processor may control a rotation speed of the display after the switch is turned on to be relatively slower than that of the display before the switch is turned on, when the switch is turned on according to the rotation of the display in the second direction.

The processor may stop the rotation of the display and displays a user interface (UI) for returning the display to an original state and a UI for continuously rotating the display on the display, when it is identified that the display collides with the object.

The processor may control the motor to rotate the display on the basis of a first torque while the display rotates to the second posture, and control the motor to rotate the display on the basis of a second torque relatively higher than the first torque while the display rotates to the first posture.

According to an embodiment of the disclosure, a control method of a display apparatus includes: outputting a driving signal for rotating a display in a first direction to a motor when an event for rotating the display from a first posture to a second posture occurs; and outputting a driving signal for rotating the display in a second direction to the motor when it is identified that the display collides with an object on the basis of the driving signal output to the motor and a signal received from a sensor while the display rotates.

The outputting of the driving signal for rotating the display in the first direction to the motor may include sequentially outputting first pulse signals for rotating the display in the first direction to the motor, and the sensor may output second pulse signals whenever the display rotates by a predetermined angle.

The identifying of the collision may include identifying that the display collides with the object in a case where a relationship between the number of first pulse signals output to the motor and the number of second pulse signals output from the sensor does not satisfy a predetermined relationship, and the predetermined relationship may be determined on the basis of a ratio between the number of first pulse signals required to rotate the display from the first posture to the second posture and the number of second pulse signals that are to be output from the sensor depending on a rotation angle of the display in a case where the display rotates from the first posture to the second posture.

The control method of a display apparatus may further include outputting a driving signal for rotating the display to the first posture to the motor from after the switch is turned on, when the switch is turned on according to the rotation of the display in the second direction, wherein the outputting of the driving signal for rotating the display to the first posture to the motor includes outputting first pulse signals of which the number corresponds to a rotation angle by which the display is to rotate to the motor from a point in time at which the switch is turned on, to allow the switch to be pressed by a degree by which the switch is pressed before the event occurs, when the switch is turned on according to the rotation of the display in the second direction.

The first posture may be perpendicular to the second posture, and the switch may include: a first switch pressed in a state where the display is in the first posture; and a second switch pressed in a state where the display is in the second posture.

The control method of a display apparatus may further include: outputting a first driving signal for rotating the display to the first posture to the motor from after the first switch is pressed, when the first switch is pressed according to the rotation of the display in the second direction due to the collision, after a first event for rotating the display from the first posture to the second posture occurs in a state where the first switch is pressed on the basis of the display of the first posture; and outputting a second driving signal for rotating the display to the second posture to the motor from after the second switch is pressed, when the second switch is pressed according to the rotation of the display in the first direction due to the collision, after a second event for rotating the display from the second posture to the first posture occurs in a state where the second switch is pressed on the basis of the display of the second posture.

The control method of a display apparatus may further include controlling a rotation speed of the display during the rotation of the display in the second direction to be relatively slower than that of the display during the rotation of the display in the first direction.

The control method of a display apparatus may further include controlling a rotation speed of the display after the switch is turned on to be relatively slower than that of the display before the switch is turned on, when the switch is turned on according to the rotation of the display in the second direction.

The control method of a display apparatus may further include stopping the rotation of the display and displaying a UI for returning the display to an original state and a UI for continuously rotating the display on the display, when it is identified that the display collides with the object.

The control method of a display apparatus may further include: controlling the motor to rotate the display on the basis of a first torque while the display rotates to the second posture, and controlling the motor to rotate the display on the basis of a second torque relatively higher than the first torque while the display rotates to the first posture.

According to the diverse embodiments of the disclosure as described above, in a case where the display apparatus collides with the object, the rotation of the display apparatus may be stopped and the display may return to a state before being rotated. Therefore, injury of a user colliding with the display apparatus may be prevented, and a damage risk of the object colliding with the display apparatus or the display apparatus may be prevented.

In addition, in the disclosure, a horizontal state and a vertical state of the display apparatus may be precisely implemented by rotating the display on the basis of a driving signal for disposing the display in a completely horizontal state or a completely vertical state from after the switch is turned on (that is, from after the switch is pressed).

BRIEF DESCRIPTION OF THE DRAWINGS

The above and/or other aspects, features, and advantages of certain embodiments of the present disclosure will be more apparent from the following description taken in conjunction with the accompanying drawings, in which.

DETAILED DESCRIPTION

First, general terms have been selected in consideration of functions of the disclosure as terms used in the specification and the claims. However, these terms may be changed depending on an intention of those skilled in the art, legal or technical interpretation, the emergence of a new technology, and the like. In addition, some terms are terms arbitrarily selected by an applicant. These terms may be interpreted in the meanings defined herein, and may be interpreted based on a general content of the specification and usual technical knowledge in the art as long as they are not specifically defined.

Further, in describing the disclosure, when it is determined that a detailed description for known functions or configurations related to the disclosure may unnecessarily obscure the gist of the disclosure, the detailed description therefor will be abbreviated or omitted.

Furthermore, embodiments of the disclosure will hereinafter be described in detail with reference to the accompanying drawings and contents described in the accompanying drawings, but the disclosure is not limited or restricted by the embodiments.

Hereinafter, the disclosure will be described in detail with reference to the accompanying drawings.

Figure 1A:
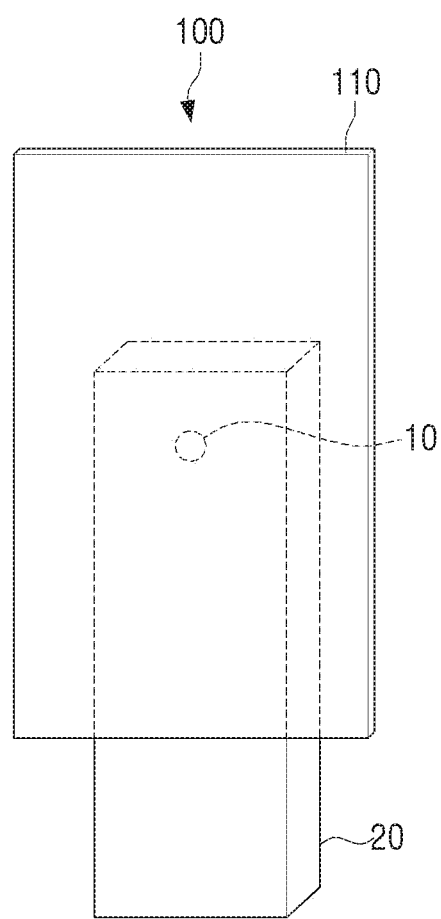
FIG. 1A is a view illustrating a display apparatus of a portrait posture according to an embodiment of the disclosure.
Figure 1B:
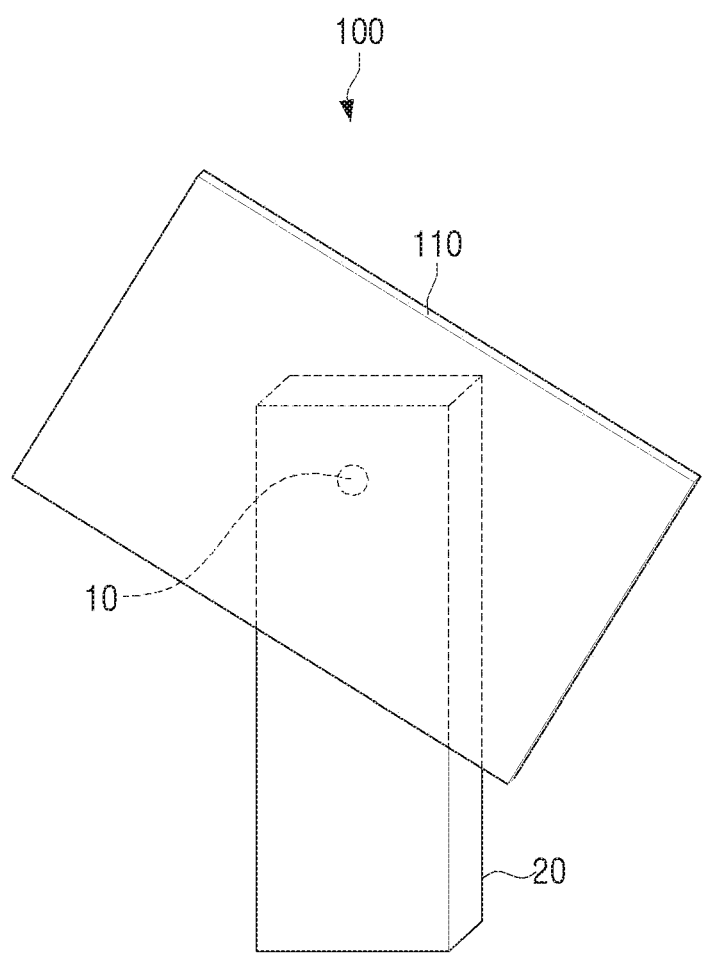
FIG. 1B is a view illustrating rotation of the display apparatus according to an embodiment of the disclosure.
Figure 1C:
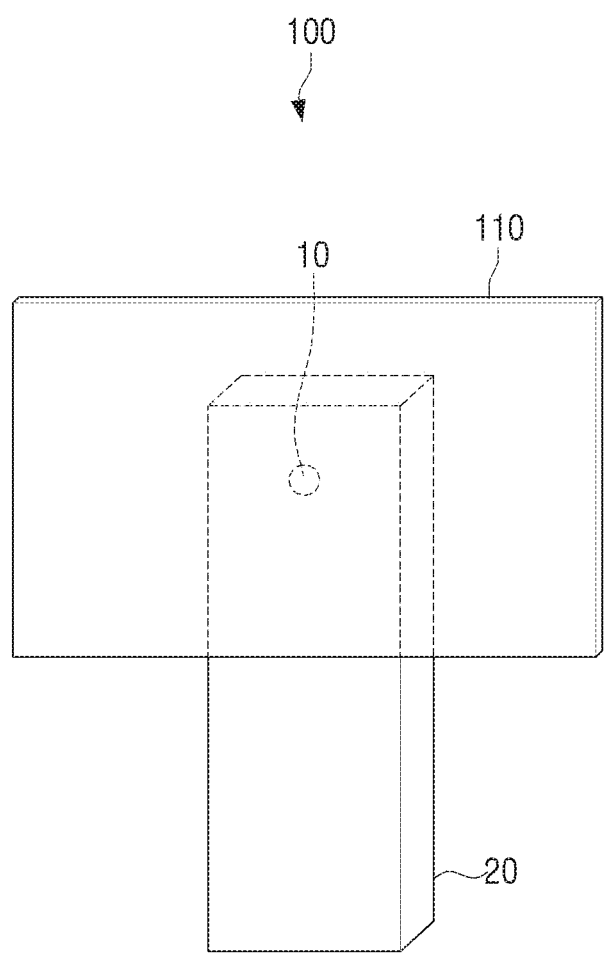
FIG. 1C is a view illustrating the display apparatus of a landscape posture according to an embodiment of the disclosure.

FIGS. 1A to 1C are views for describing operations of a display apparatus according to an embodiment of the disclosure.

A display apparatus 100 according to an embodiment of the disclosure may be implemented by various display apparatuses such as a television (TV), a smart TV, a monitor, an electronic frame, an electronic bulletin board, an electronic table, a laptop computer, a large format display (LFD), and the like.

Referring to FIGS. 1A to 1C, the display apparatus 100 may include a display 110 and a supporting stand 20 for supporting the display 110. However, according to an embodiment, the display apparatus 100 may be implemented without the supporting stand 20.

The display apparatus 100 may rotate the display 110 when an event for rotating the display 110 occurs. Here, an example of the event for rotating the display 110 may include a case where a user command for rotating the display 110 is input, a case where resolution of an image to be displayed is changed, or the like, but is not necessarily limited thereto.

Referring to FIGS. 1A to 10, the display 110 may rotate around a rotation center 10 in a state where a direction toward which a front surface is directed is fixed. Here, the front surface refers to a direction toward which a screen of the display 110 is directed.

According to an embodiment of the disclosure, the display 110 may rotate from a portrait posture (or a posture in a vertical direction) to a landscape posture (or a posture in a horizontal direction), and vice versa.

Here, the portrait posture refers to a posture in which the display 110 is disposed in a form in which a vertical length of the display 110 is longer than a horizontal length of the display 110 with respect to the ground, and the landscape posture refers to a posture in which the display 110 is disposed in a form in which a horizontal length of the display 110 is longer than a vertical length of the display 110 with respect to the ground.

For example, when a user command for rotating the display 110 is input in a state where the display 110 is in a state of the portrait posture as illustrated in FIG. 1A, the display apparatus 100 may rotate the display 110 in a counterclockwise direction.

Figure 10:
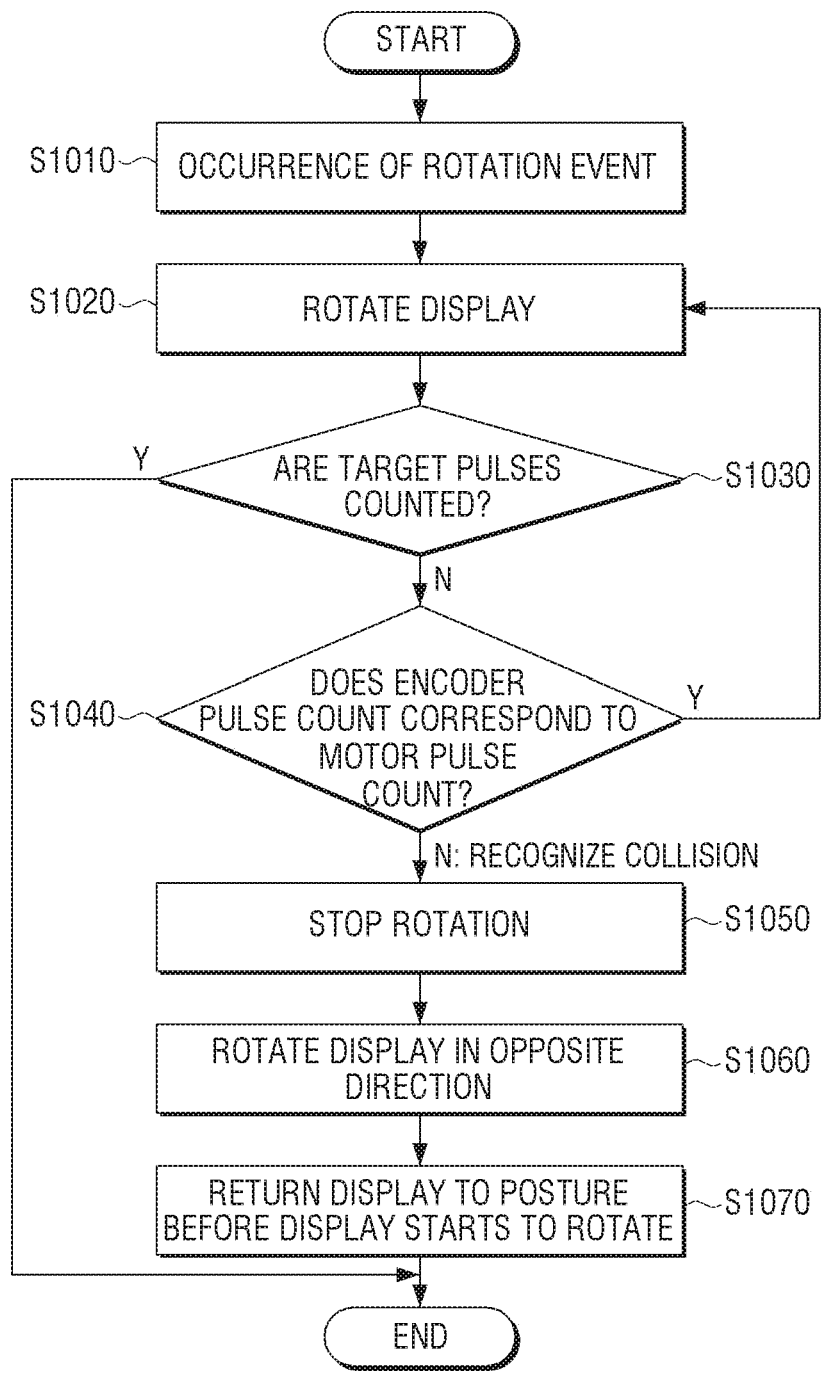
FIG. 10 is a flowchart for describing rotation of the display apparatus according to an embodiment of the disclosure.

In this case, the display 110 may become a posture as illustrated in FIG. 1B and then become the landscape posture illustrated in FIG. 10.

Alternatively, when a user command for rotating the display 110 is input in a state where the display 110 is in a state of the landscape posture as illustrated in FIG. 10, the display apparatus 100 may rotate the display 110 in a clockwise direction.

In this case, the display 110 may become a posture as illustrated in FIG. 1B and then become the portrait posture illustrated in FIG. 1A.

Meanwhile, an embodiment in which the display 110 rotates is not limited to that illustrated in FIGS. 1A to 10. For example, the display 110 may rotate in a clockwise direction from the portrait posture to become the landscape posture or may rotate in a counterclockwise direction from the landscape posture to become the portrait posture.

In addition, a case where the display 110 rotates in the counterclockwise direction or the clockwise direction by 90° to become the portrait posture or the landscape posture has been described hereinabove by way of example, but an embodiment is not limited thereto. For example, the display 110 may rotate in the counterclockwise direction or the clockwise direction by 90° from the portrait posture to become the landscape posture, and may further rotate in the same direction by 90° from the landscape posture to become the portrait posture.

Meanwhile, when the display 110 rotates, in a case where an object is present in a rotation radius of the display 110, the display 110 may collide with the object.

In a case where the display 110 and the object collide with each other as described above, the rotation of the display 110 needs to be stopped. The reason is that when the display apparatus rotates, there is a risk that a user colliding with the display apparatus will be injured and there is a risk that the object colliding with the display apparatus or the display apparatus will be damaged.

To remove such a risk, the display apparatus 100 according to the disclosure may stop the rotation of the display 110 and return the display 110 to a state before the display 110 rotates, when it is identified that the display 110 collides with the object. This will hereinafter be described with reference to FIG. 2.

Figure 2:
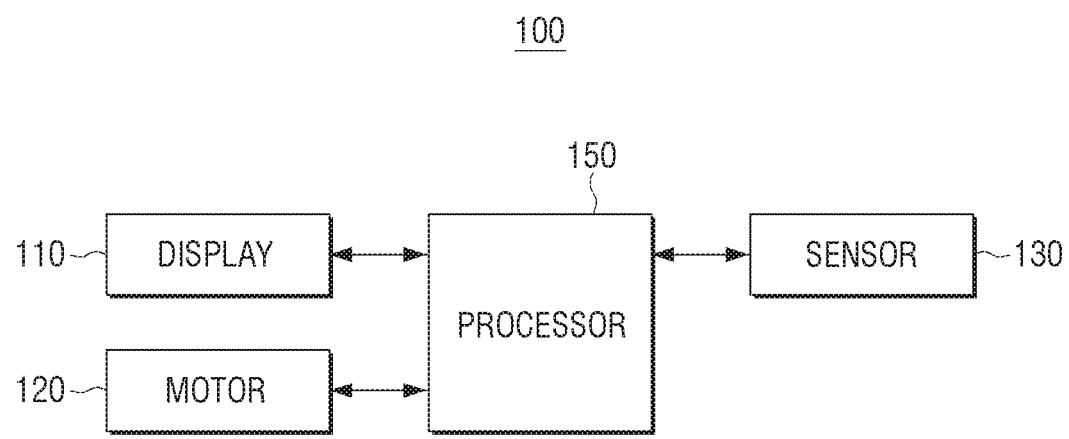
FIG. 2 is a block diagram for describing the display apparatus according to an embodiment of the disclosure.

FIG. 2 is a block diagram for describing the display apparatus according to an embodiment of the disclosure.

Referring to FIG. 2, the display apparatus 100 according to an embodiment of the disclosure includes a display 110, a motor 120, a sensor 130, and a processor 150. Meanwhile, although not illustrated in FIG. 2, the display apparatus 100 may further include a switch 140. Here, the switch 140 may include a first switch 141 and a second switch 142.

The display 110 may display various images. Here, the image is a content including at least one of a still image or a moving image, and the display 110 may display various images such as a broadcasting content, a multimedia content, and the like. In addition, the display 110 may display various user interfaces (UIs) and icons.

The display 110 may rotate depending on driving of the motor 120. In this case, the display 110 may rotate around the rotation center 10 in a state where a front surface thereof is maintained in a predetermined direction. Here, the rotation center 10 may be positioned at a geometric center of the display 110, but is not necessarily limited thereto and may also be positioned at another position of the display 110.

According to an embodiment of the disclosure, the display 110 may rotate between a first posture and a second posture perpendicular to the first posture. That is, the display 110 may rotate in a forward direction, which is a first direction, from the first posture to become the second posture, and rotate in a reverse direction, which is a second direction, from the second posture to become the first posture.

In this case, the first posture may be any one of the portrait posture and the landscape posture, and the second posture may be the other of the portrait posture and the landscape posture. That is, the first posture may be a posture perpendicular to the second posture. In addition, the forward direction may be any one of the counterclockwise direction and the clockwise direction, and the reverse direction may be the other of the counterclockwise direction and the clockwise direction.

Hereinafter, for convenience of explanation, it is assumed that the first posture is the portrait posture, the second posture is the landscape posture, the first direction is the counterclockwise direction, which is the forward direction, and the second direction is the clockwise direction, which is the reverse direction.

Such a display 110 may be implemented by various types of displays such as a liquid crystal display (LCD) panel, a light emitting diode (LED), an organic light emitting diode (OLED), a liquid crystal on silicon (LCoS), a digital light processing (DLP), and the like. In addition, a driving circuit, a backlight unit, and the like, that may be implemented in a form such as an a-si thin film transistor (TFT), a low temperature poly silicon (LTPS) TFT, an organic TFT (OTFT), and the like, may be included in the display 110.

In addition, the display 110 may be implemented by a touch screen by combining with a touch sensor.

The motor 120 may rotate the display 110. In detail, the motor 120 may be connected to a gear (for example, a circular gear) coupled to the display 110, and may rotate the gear according to control of the processor 160 to rotate the display 110. Alternatively, the motor 120 may stop the rotation of the gear according to control of the processor 160 to stop the rotation of the display 110.

To this end, the motor 120 may be implemented by a step motor that may generate a torque, but this is only an example, and the motor 120 may be implemented by various motors such as an alternating current (AC) motor, a direct current (DC) motor and the like.

The sensor 130 may sense the rotation of the display 110. In detail, the sensor 130 may sense the rotation of the gear rotating by the motor 120 to sense the rotation of the display 110 coupled to the gear.

To this end, the sensor 130 may implemented by an encoder (for example, a rotary encoder). In this case, the sensor 130 may include a light emitting element (for example, a light emitting diode (LED), a rotating disk including a plurality of slots, and a light receiving element (for example, a photodiode). In addition, the sensor 130 may sense the rotation of the display 110 on the basis of the fact that light output by the light emitting element passes through the slots of the rotating disk and then arrives at the light receiving element.

Meanwhile, the sensor 130 may output a pulse signal when the rotation of the display 110 is sensed. That is, the sensor 130 may output the pulse signal when the rotating disk rotates by a predetermined angle according to the rotation of the gear.

A case where the sensor 130 is the encoder has been described hereinabove, but the sensor 130 according to the disclosure is not necessarily limited thereto. For example, the sensor 130 may be implemented by various sensors such as an infrared sensor or the like that may sense the rotation.

The switch 140 is a component related to control of at least one of a rotation angle or a rotation speed of the display 110. The switch according to an embodiment of the disclosure may be implemented by a limit switch, but is not necessarily limited thereto. A description related to the switch 140 will be described below in FIG. 4.

The processor 150 controls a general operation of the display apparatus 100. To this end, the processor 150 may include one or more of a central processing unit (CPU), an application processor (AP), or a communication processor (CP).

The processor 150 may drive an operating system or an application program to control hardware or software components connected to the processor 150, and may perform various types of data processing and calculation. In addition, the processor 150 may load and process commands or data received from at least one of other components in a volatile memory, and store various data in a non-volatile memory.

The processor 150 may control the motor 120 to rotate the display 110 when a rotation event for rotating the display 110 occurs.

Here, the rotation event may be an event in which a user command for rotating the display 110 is input, an event in which a predetermined time arrives, an event in which resolution of an image to be displayed and a posture of the display 110 do not match each other, and the like. However, this is only an example, and the rotation event according to the disclosure is not limited thereto.

In detail, the processor 150 may rotate the display 110 when the user command for rotating the display 110 is input. Here, the user command may be a command for selecting a specific button provided in the display apparatus 100 or a remote controller, a command for selecting a menu displayed on the display 110, a command for selecting a menu displayed on a user terminal such as a smartphone, or the like.

As described above, when the user command is input, the processor 150 may control the motor 120 to rotate the display 110.

In addition, in a case where a time at which the posture of the display 110 is to be changed is predetermined in the display apparatus 100, the processor 150 may control the motor 120 to rotate the display 110 when the predetermined time arrives.

In addition, the processor 150 may rotate the display 110 in a case where resolution of an image to be displayed and resolution corresponding to a current posture of the display 110 do not match each other.

In detail, the processor 150 may identify that an image having resolution in which a horizontal length is larger than a vertical length corresponds to the landscape posture and an image having resolution in which a vertical length is larger than a horizontal length corresponds to the portrait posture.

In addition, when a reproduction command for the image of the resolution in which the horizontal length is larger than the vertical length is input in a state where the display 110 is in the state of the portrait posture, the processor 150 may identify that the image does not correspond to the posture of the display 110, and rotate the display 110 to become the landscape posture. On the other hand, when a reproduction command for the image of the resolution in which the vertical length is larger than the horizontal length is input in a state where the display 110 is in the state of the landscape posture, the processor 150 may identify that the image does not correspond to the posture of the display 110, and rotate the display 110 to become the portrait posture.

Meanwhile, the processor 150 may output a driving signal for rotating the display 110 to the motor 120 when the event for rotating the display 110 occurs.

In detail, the processor 150 may output a driving signal for rotating the display 110 in the first direction to the motor 120 when an event for rotating the display 110 from the first posture to the second posture occurs.

Here, the driving signal may be a pulse signal. In detail, the processor 150 may sequentially output pulse signals for rotating the display 110 in the first direction to the motor 120 when the event for rotating the display 110 from the first posture to the second posture occurs. For example, in a case where the display 110 rotates by ¼ turn (that is, 90°) when the motor 120 rotates forty times and the motor 120 rotates by 1.8° per pulse, the processor 150 may sequentially output pulse signals to the motor 120 until 8,000 pulses are counted, to rotate the display 110 by 90°.

Meanwhile, the processor 150 may receive a signal output by the sensor 130 from the sensor 130 while the display 110 rotates.

As described above, the sensor 130 may sense the rotation of the display 110, and output the pulse signal whenever the display 110 rotates by a predetermined angle. For example, in a case where the sensor 130 outputs the pulse signal when the display 110 rotates by 0.1125°, the sensor 130 may output 800 pulse signals when the display 110 rotates by ¼ turn (that is, 90°).

In addition, the processor 150 may identify whether or not the display 110 collides with the object on the basis of the driving signal output to the motor 120 and the signal received from the sensor 130.

In detail, the processor 150 may identify that the display 110 collides with the object in a case where a relationship between the number of pulse signals output to the motor 120 and the number of pulse signals output from the sensor 120 does not satisfy a predetermined relationship.

Here, the predetermined relationship may be determined on the basis of a ratio between the number of pulse signals required to rotate the display 110 from the first posture to the second posture and the number of pulse signals that are to be output from the sensor 120 depending on a rotation angle of the display 110 in a case where the display 110 rotates from the first posture to the second posture.

For example, in a case where the number of pulse signals required to rotate the display 110 from the first posture to the second posture is 8,000 and the display 110 rotates from the first posture to the second posture (that is, in a case where the display 110 rotates by) 90°, when the number of pulse signals that are to be output from the sensor 120 is 800, the predetermined relationship may be a relationship of 10:1, which is a ratio between the number of pulses included in the driving signal and the number of pulses included in the signal output by the sensor 120.

Therefore, in a case where the number of pulse signals output from the sensor 120 is not 400, but is 390 in a state where the number of pulse signals output to the motor 120 is 4,000, which is a case where the predetermined relationship described above is not satisfied, the processor 150 may identify that the display 110 collides with the object.

In addition, when it is identified that the display 110 collides with the object, the processor 150 may output a driving signal for rotating the display 110 in the second direction, which is an opposite direction to the first direction described above, to the motor 120.

That is, when the display 110 collides with the object while rotating in the first direction, the processor 150 may stop the rotation of the display 110 in the first direction and rotate the display 110 in the second direction to return the display 110 to a state before the rotation.

Therefore, in the disclosure, injury of the user colliding with the display apparatus 100 may be prevented, and a damage risk of the object colliding with the display apparatus 100 or the display apparatus 100 may be prevented.

Figure 3:
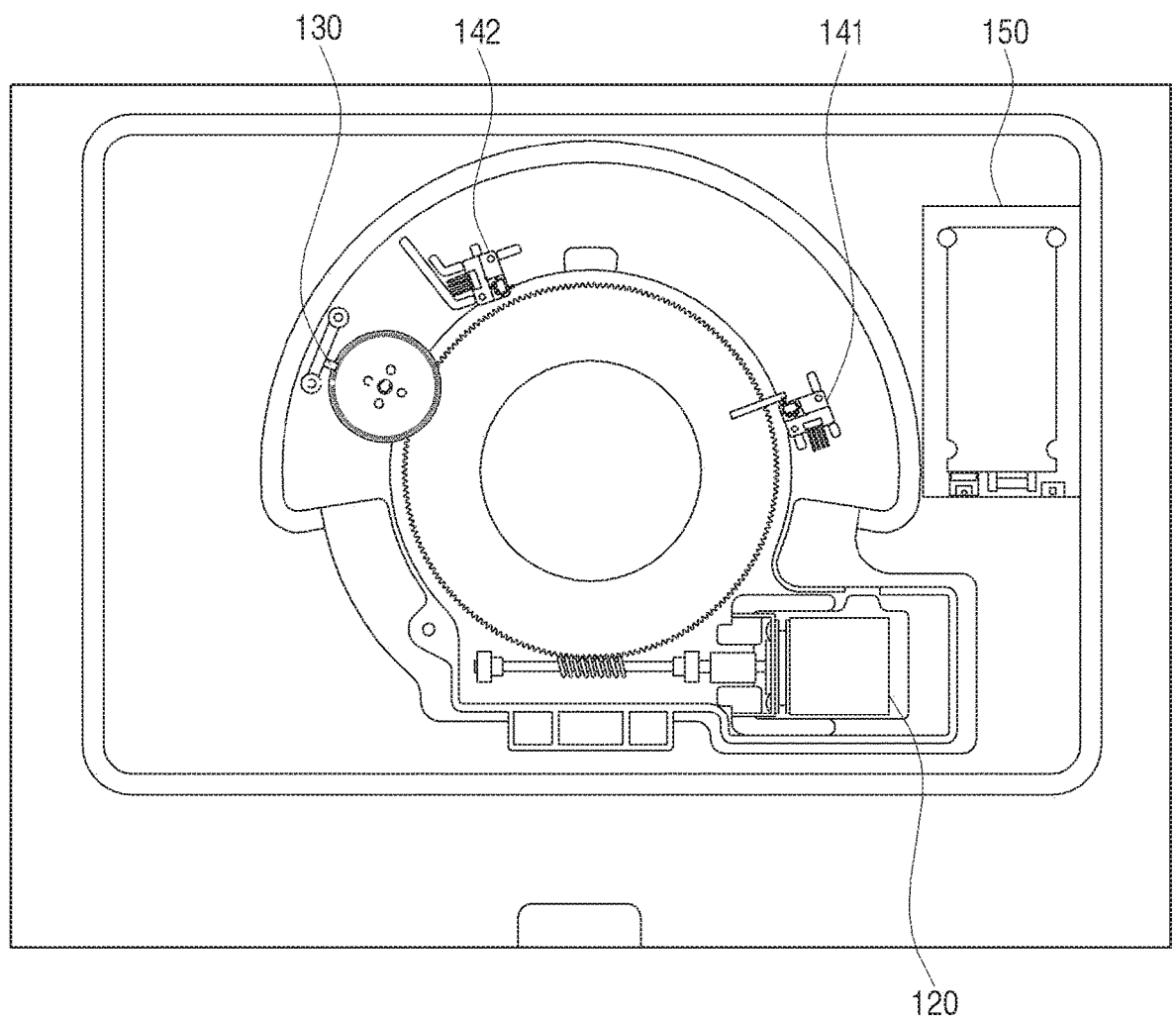
FIG. 3 is a view for describing a connection structure of components included in the display apparatus according to an embodiment of the disclosure.

FIG. 3 is a view for describing a connection structure of components included in the display apparatus according to an embodiment of the disclosure.

Referring to FIG. 3, the display apparatus 100 according to an embodiment of the disclosure may include a motor 120, a sensor 130, a first switch 141, a second switch 142, and a processor 150. In addition, the display 110 may be coupled to a circular gear connected to the motor 120 to rotate according to rotation of the circular gear.

The processor 150 may be electrically connected to a plurality of boards including the motor 120, the sensor 130, the first switch 141, and the second switch 142. Therefore, the processor 150 may control the respective components of the display apparatus 100, and receive signals from the respective components.

Meanwhile, internal components of the display apparatus 100 according to an embodiment of the disclosure are illustrated in FIG. 3, but arrangement positions, arrangement forms, and connection structures of the motor 120, the sensor 130, the first switch 141, the second switch 142, and the processor 150 may be different from each other according to embodiments.

Meanwhile, the first switch 141 may include a bar that is pressed when the display 110 is in the first posture (that is, the portrait posture), and the second switch 142 may include a bar that is pressed when the display 110 is in the second posture (that is, the landscape posture). Hereinafter, this will be described in detail with reference to FIG. 4.

Figure 4:
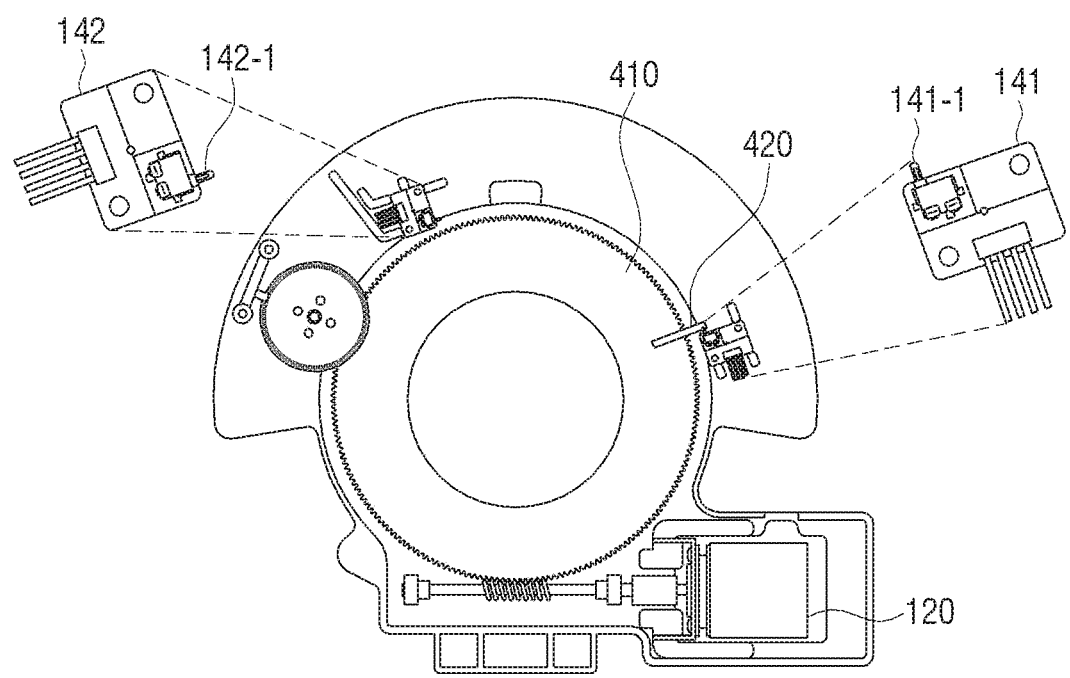
FIG. 4 is a view illustrating internal components of the display apparatus according to an embodiment of the disclosure.
Figure 5:
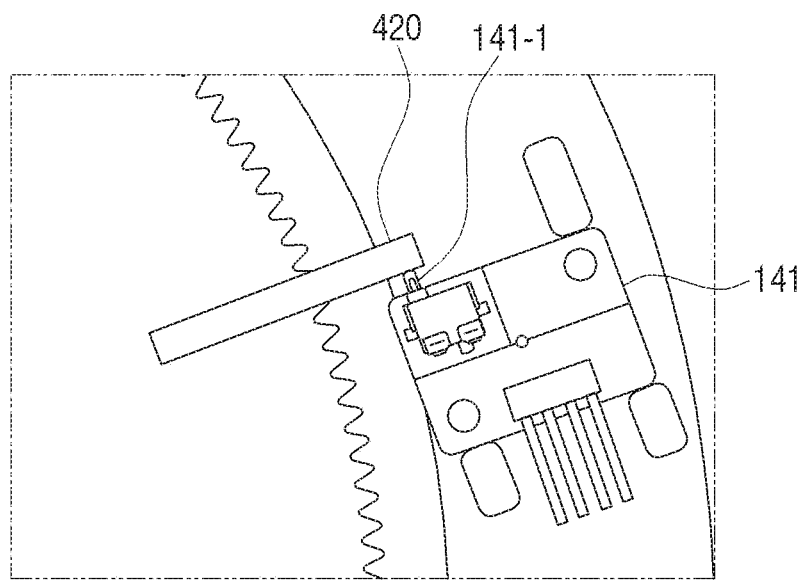
FIG. 5 is a view for describing rotation of a switch and a display apparatus according to an embodiment of the disclosure.

FIGS. 4 and 5 are views for describing rotation of a switch and a display apparatus according to an embodiment of the disclosure.

Referring to FIG. 4, the display apparatus 100 according to an embodiment of the disclosure may include the first switch 141 pressed in a state where the display 110 is in the first posture (that is, the portrait posture) and the second switch 142 pressed in a state where the display 110 is in the second posture (that is, the landscape posture).

In detail, referring to FIG. 5, a bar 141-1 of the first switch 141 may be pressed by a predetermined first angle by a bar 420 included in a circular gear 410 while the display 110 is in the first posture. Similarly, a bar 142-1 of the second switch 142 may be pressed by a predetermined second angle by the bar 420 included in the circular gear 410 while the display 110 is in the second posture. Here, the predetermined first and second angles may be different from each other or be the same as each other.

To this end, information on a first driving signal for rotating the display 110 to the first posture from after the first switch 141 is pressed (that is, from after the first switch 141 is turned on) and information on a second driving signal for rotating the display 110 to the second posture from after the second switch 142 is pressed (that is, from after the second switch 142 is turned on) may be pre-stored in the display apparatus 100. Here, the information on the first driving signal may include information on a signal required to press the first switch 141 by the predetermined first angle, and the information the second driving signal may include information on a signal required to press the second switch 142 by the predetermined second angle.

Therefore, when the first switch 141 is pressed according to the rotation of the display 110 from the second posture to the first posture, the processor 150 may rotate the display 110 to the first posture on the basis of the pre-stored information on the first driving signal from after the first switch 141 is pressed. Likewise, when the second switch 142 is pressed according to the rotation of the display 110 from the first posture to the second posture, the processor 150 may rotate the display 110 to the second posture on the basis of the pre-stored information on the second driving signal from after the second switch 142 is pressed.

For example, when it is identified that a driving signal including ten pulses is required to rotate the display 110 to the first posture from after the first switch 141 is pressed, on the basis of the pre-stored information on the first driving signal, the processor 150 may sequentially output pulse signals to the motor 120 from after the first switch 141 is pressed until the ten pulses are counted.

Meanwhile, the information on the driving signal as described above may be stored by a calibration apparatus (not illustrated) in a step for calibration of the display 110. Here, the calibration apparatus may include a jig, a laser sensor and the like, but is not necessarily limited thereto.

In detail, the calibration apparatus may dispose the first posture of the display 110 in a completely vertical state and dispose the second posture of the display 110 in a completely horizontal state, through the calibration.

To this end, the calibration apparatus may first rotate the display 110 from the first posture to the second posture.

In addition, when the display 110 rotates to the second posture, the calibration apparatus may additionally rotate the display 110 to dispose the display 110 in the completely horizontal state. In this case, the second angle by which the second switch 142 is pressed may be measured.

Then, the calibration apparatus may again rotate the display 110 to the first posture. In addition, when the display 110 rotates to the first posture, the calibration apparatus may additionally rotate the display 110 to dispose the display 110 in the completely vertical state. In this case, the first angle by which the first switch 141 is pressed may be measured.

The display apparatus 100 may receive information on the first angle by which the first switch 141 is pressed and information on the second angle by which the second switch 142 is pressed, as measured by the calibration apparatus.

In addition, the display apparatus 100 may store the information on the first driving signal for rotating the display 110 by the first angle and the information on the second driving signal for rotating the display 110 by the second angle on the basis of the received information on the first angle and information on the second angle.

Therefore, when the first switch 141 is pressed according to the rotation of the display 110 from the second posture to the first posture, the processor 150 may rotate the display 110 to the first posture on the basis of the pre-stored information on the first driving signal to rotate the display 110 by the first angle from after the first switch 141 is pressed. Likewise, when the second switch 142 is pressed according to the rotation of the display 110 from the first posture to the second posture, the processor 150 may rotate the display 110 to the second posture on the basis of the pre-stored information on the second driving signal to rotate the display 110 by the second angle from after the second switch 142 is pressed.

Meanwhile, a case where the processor 150 stores the information on the first and second driving signals has been described hereinabove, but the processor 150 may store only the information on the first and second angles, according to an embodiment. In this case, when the second switch 142 is pressed according to the rotation of the display 110 from the first posture to the second posture, the processor 150 may transmit a driving signal for rotating the display 110 by the second angle to the motor 120 on the basis of the pre-stored information on the second angle.

As described above, in the disclosure, the display apparatus is rotated on the basis of the pre-stored information on the driving signal after the switch is pressed, such that a horizontal state and a vertical state of the display apparatus may be precisely implemented.

When describing the contents described above in relation to the collision of the display 110, an operation of the display apparatus 100 is as follows.

First, when the display 110 is in the first posture, the first switch 141 is in an electrical "on" state and is in a mechanical state in which it is pressed by the predetermined first angle. In such a state, when an event for rotating the display 110 to the second posture occurs, the processor 150 may output the driving signal for rotating the display 110 in the first direction to the motor 120. In this case, the first switch 141 may be turned off according to the rotation of the display 110 in the first direction.

In addition, when it is identified that the display 110 collides with the object on the basis of the driving signal output to the motor 120 and the signal received from the sensor 130 while the display 110 rotates, the processor 150 may output the driving signal for rotating the display 110 in the second direction to the motor 120.

In addition, when the switch (that is, the first switch) in an electrical "off" state is turned on according to the rotation of the display 110 in the second direction (that is, when the switch is pressed), the processor 150 may output the driving signal for rotating the display 110 to the first posture to the motor 120 on the basis of the pre-stored information on the first driving signal from after the switch is turned on (that is, after the switch is pressed).

That is, when the switch is pressed according to the rotation of the display 110 in the second direction, the processor 150 may identify a rotation angle by which the display 110 is to rotate from a point in time at which the switch is pressed on the basis of the pre-stored information on the driving signal and output pulse signals of which the number corresponds to the rotation angle to the motor, to allow the switch to be pressed by a degree by which the switch is pressed before a rotation event occurs.

Similarly, when an event for rotating the display 110 to the first posture occurs in a state where the display 110 is in the second posture (that is, in a state where the second switch is pressed), the processor 150 may output the driving signal for rotating the display 110 in the second direction to the motor 120.

Then, when it is identified that the display 110 collides with the object, the processor 150 may output the driving signal for rotating the display 110 in the first direction to the motor 120.

In addition, when the switch (that is, the second switch) is pressed according to the rotation of the display 110 in the first direction, the processor 150 may output the driving signal for rotating the display 110 to the second posture to the motor 120 on the basis of the pre-stored information on the second driving signal from after the switch is pressed.

Therefore, in the disclosure, even in a case of returning the display 110 to an original state due to the collision, the display 110 may be disposed in the completely vertical state or the completely horizontal state.

Meanwhile, an example in which the display 110 rotates from the first posture to the second posture or rotates from the second posture to the first posture using the two switches 141 and 142 has been described hereinabove. However, this is only an example, and in the disclosure, the display 110 may rotate from the first posture to the second posture or rotate from the second posture to the first posture using one switch. Hereinafter, a description will be provided with reference to FIGS. 6A to 7B.

Figure 6A:
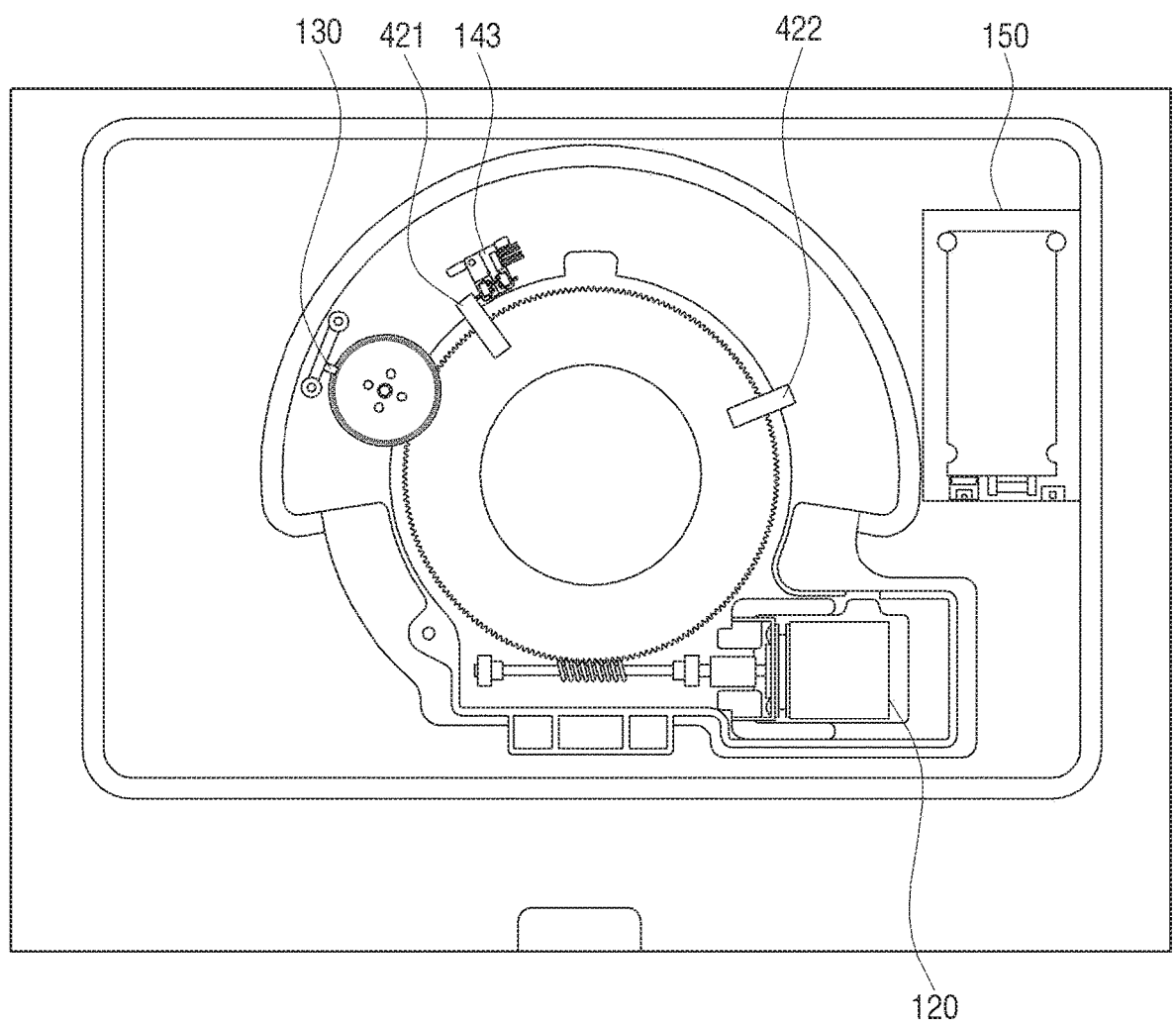
FIGS. 6A and 6B are views for describing rotation of a switch and a display apparatus according to an embodiment of the disclosure.
Figure 6B:
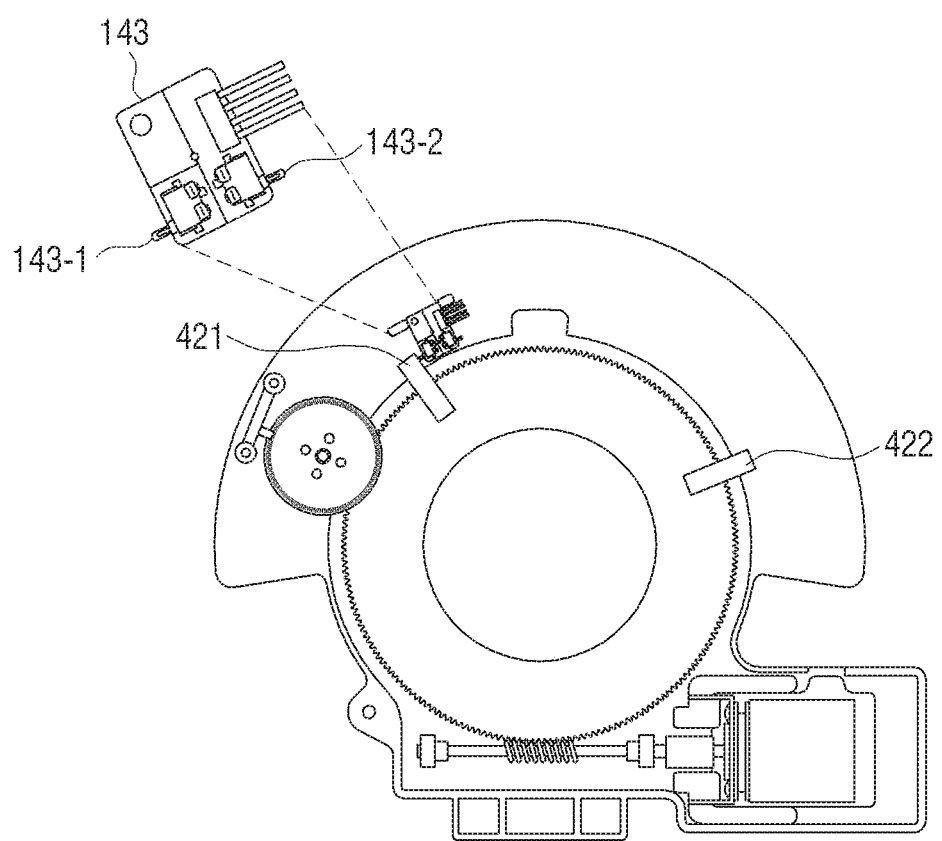

FIGS. 6A and 6B are views for describing rotation of a switch and a display apparatus according to an embodiment of the disclosure.

Referring to FIG. 6A, the display apparatus 100 according to an embodiment of the disclosure includes a motor 120, a sensor 130, a switch 143, and a processor 150. In addition, the display 110 may be coupled to a circular gear connected to the motor 120 to rotate according to rotation of the circular gear.

The processor 150 may be electrically connected to the motor 120, the sensor 130, and the switch 143. Therefore, the processor 150 may control the respective components of the display apparatus 100, and receive signals from the respective components.

The switch 143 may include a first bar pressed by a first bar 421 included in a circular gear 410 when the display 110 is in the first posture (that is, the portrait posture) and a second bar pressed by a second bar 422 included in the circular gear 410 when the display 110 is in the second posture (that is, the landscape posture). Hereinafter, this will be described in detail with reference to FIG. 6B.

Referring to FIG. 6B, the switch 143 according to an embodiment of the disclosure may include a first bar 143-1 pressed in a state where the display 110 is in the first posture (that is, the portrait posture) and a second bar 143-2 pressed in a state where the display 110 is in the second posture (that is, the landscape posture).

Here, the first bar 143-1 may be pressed by a predetermined first angle by the first bar 421 included in the circular gear 410 while the display 110 is in the first posture. In addition, the second bar 143-2 may be pressed by a predetermined second angle by the second bar 422 included in the circular gear 410 while the display 110 is in the second posture. Here, the predetermined first and second angles may be different from each other or be the same as each other.

To this end, information on a first driving signal for rotating the display 110 to the first posture from after the first bar 143-1 is pressed (that is, from after the switch 143 is turned on by the first bar 143-1) and information on a second driving signal for rotating the display 110 to the second posture from after the second bar 143-2 is pressed (that is, from after the switch 143 is turned on by the second bar 143-2) may be pre-stored in the display apparatus 100. Here, the information on the first driving signal may include information on a signal required to press the first bar 143-1 by the predetermined first angle, and the information the second driving signal may include information on a signal required to press the second bar 143-2 by the predetermined second angle.

Therefore, when the first bar 143-1 is pressed by the first bar 421 included in the circular gear 410 according to the rotation of the display 110 from the second posture to the first posture, the processor 150 may rotate the display 110 to the first posture on the basis of the pre-stored information on the first driving signal from after the first bar 143-1 is pressed. Likewise, when the second bar 143-2 is pressed by the second bar 422 included in the circular gear 410 according to the rotation of the display 110 from the first posture to the second posture, the processor 150 may rotate the display 110 to the second posture on the basis of the pre-stored information on the second driving signal from after the second bar 143-2 is pressed.

For example, when it is identified that a driving signal including ten pulses is required to rotate the display 110 to the first posture from after the first bar 143-1 is pressed, on the basis of the pre-stored information on the first driving signal, the processor 150 may sequentially output pulse signals to the motor 120 from after the first bar 143-1 is pressed until the ten pulses are counted.

Meanwhile, the information on the driving signal as described above may be stored by a calibration apparatus (not illustrated) in a step for calibration of the display 110, as described above.

As described above, in the disclosure, a horizontal state and a vertical state of the display apparatus may be precisely implemented using one switch 143.

When describing the contents described above in relation to the collision of the display 110, an operation of the display apparatus 100 is as follows.

First, when the display 110 is in the first posture, the first bar 143-1 of the switch 143 may be in a state where it is pressed by the predetermined first angle by the first bar 421 included in the circular gear 410. That is, the switch 143 is in a turn-on state while the display 110 is in the first posture. In such a state, when an event for rotating the display 110 to the second posture occurs, the processor 150 may output the driving signal for rotating the display 110 in the first direction to the motor 120. In this case, the display 110 rotates in the first direction, and the switch 143 may therefore be turned off.

In addition, when it is identified that the display 110 collides with the object on the basis of the driving signal output to the motor 120 and the signal received from the sensor 130 while the display 110 rotates, the processor 150 may output the driving signal for rotating the display 110 in the second direction to the motor 120.

In this case, the display 110 may rotate in the second direction, and the first bar 143-1 of the switch 143 may therefore be pressed by the first bar 421 included in the circular gear 410.

When the switch 143 in a turn-off state is turned on according to the rotation of the display 110 in the second direction (that is, when the first bar 143-1 is pressed by the first bar 421 included in the circular gear 410), the processor 150 may output the driving signal for rotating the display 110 to the first posture to the motor 120 on the basis of the pre-stored information on the first driving signal from after the switch is turned on (that is, from after the first bar 143-1 is pressed).

That is, when the first bar 143-1 is pressed according to the rotation of the display 110 in the second direction, the processor 150 may identify a rotation angle by which the display 110 is to rotate from a point in time at which the first bar 143-1 is pressed on the basis of the pre-stored information on the driving signal and output pulse signals of which the number corresponds to the rotation angle to the motor, to allow the first bar 143-1 to be pressed by a degree by which the first bar 143-1 is pressed before a rotation event occurs.

Similarly, when an event for rotating the display 110 to the first posture occurs in a state where the display 110 is in the state of the second posture (that is, in a state where the second bar 143-2 is pressed), the processor 150 may output the driving signal for rotating the display 110 in the second direction to the motor 120.

Then, when it is identified that the display 110 collides with the object, the processor 150 may output the driving signal for rotating the display 110 in the first direction to the motor 120.

In addition, when the second bar 143-2 is pressed according to the rotation of the display 110 in the first direction, the processor 150 may output the driving signal for rotating the display 110 to the second posture to the motor 120 on the basis of the pre-stored information on the second driving signal from after the second bar 143-2 is pressed.

Therefore, in the disclosure, even in a case of returning the display 110 to an original state due to the collision, the display 110 may be disposed in a completely vertical state or a completely horizontal state using one switch.

Meanwhile, a case where the switch 143 includes the first bar pressed by the first bar 421 included in the circular gear 410 when the display 110 is in the first posture (that is, the portrait posture) and a second bar pressed by the second bar 422 included in the circular gear 410 when the display 110 is in the second posture (that is, the landscape posture) has been described hereinabove, but the switch 143 includes the first bar pressed by the first bar 421 included in the circular gear 410 when the display 110 is in the second posture (that is, the landscape posture) and a second bar pressed by the second bar 422 included in the circular gear 410 when the display 110 is in the first posture (that is, the portrait posture), according to an embodiment.

Figure 7A:
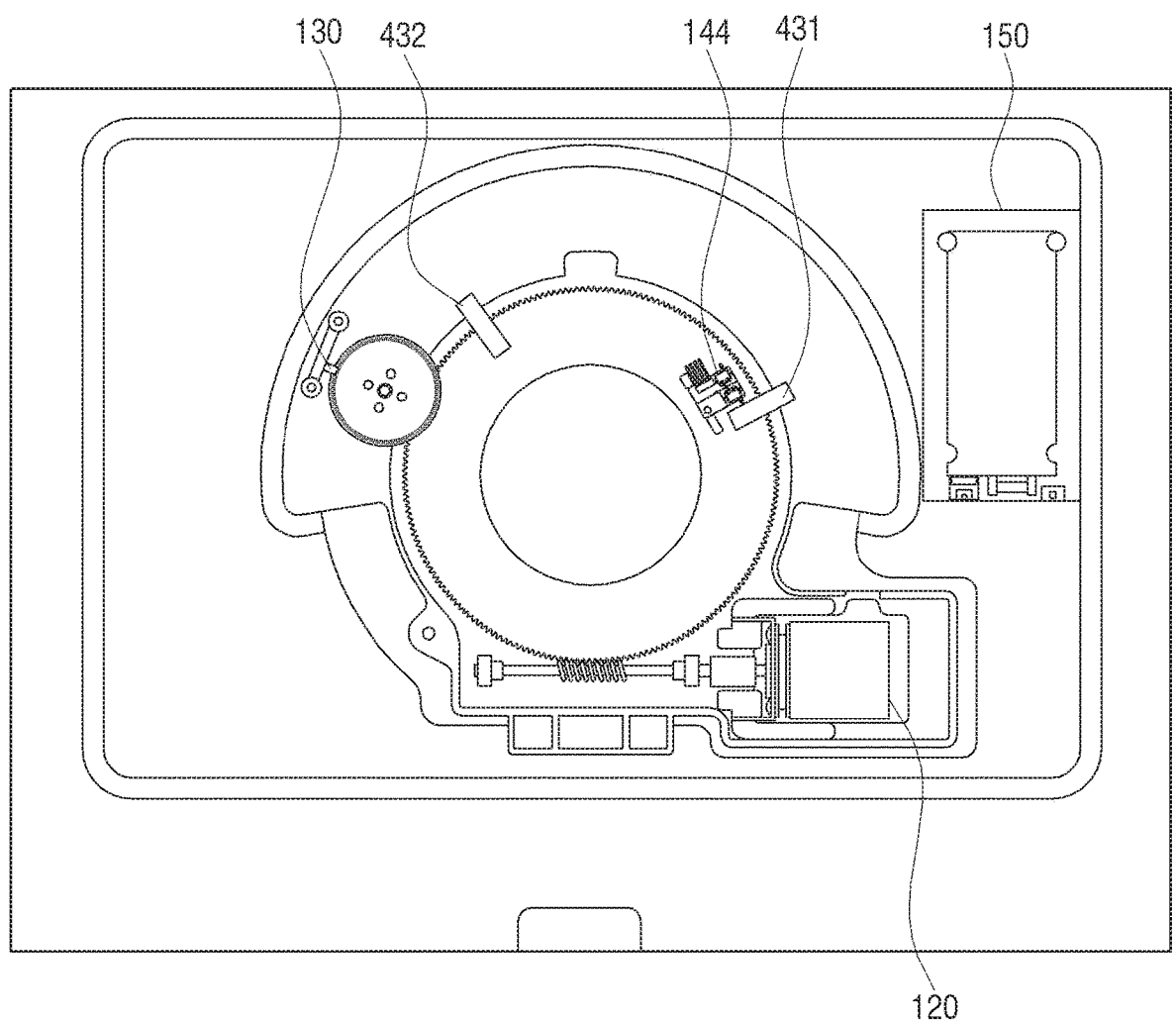
FIGS. 7A and 7B are views for describing rotation of a switch and a display apparatus according to an embodiment of the disclosure.
Figure 7B:
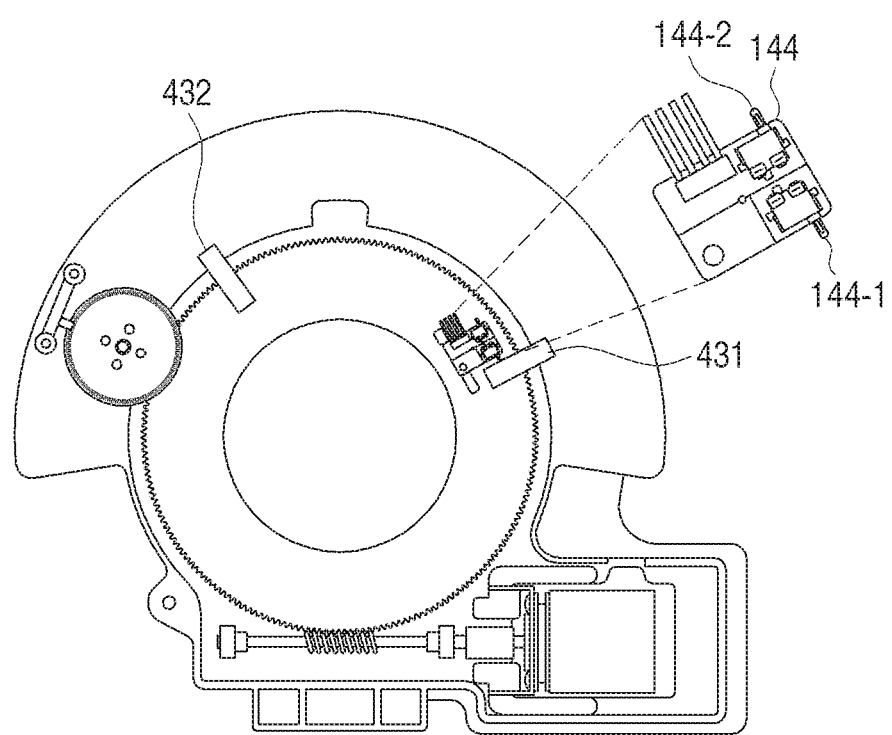

FIGS. 7A and 7B are views for describing rotation of a switch and a display apparatus according to an embodiment of the disclosure.

Referring to FIG. 7A, the display apparatus 100 according to an embodiment of the disclosure includes a motor 120, a sensor 130, a switch 144, and a processor 150. In addition, the display 110 may be connected to a circular gear connected to the motor 120 to rotate according to rotation of the circular gear.

The processor 150 may be electrically connected to the motor 120, the sensor 130, and the switch 144. Therefore, the processor 150 may control the respective components of the display apparatus 100, and receive signals from the respective components.

The switch 144 may be included in a circular gear 410. As an example, referring to FIG. 7A, the switch 144 may be disposed above the circular gear 410 and rotate together with the circular gear 410 according to rotation of the circular gear 410.

The switch 144 may include a first bar 144-1 pressed by a first bar 431 of the display apparatus 100 while the display 110 is in the first posture (that is, the portrait posture) and a second bar 144-2 pressed by a second bar 432 of the display apparatus 100 while the display 110 is in the second posture (that is, the landscape posture). Here, the first bar 431 of the display apparatus 100, which is a bar disposed outside the circular gear 410, may be implemented in a form in which it is in contact with the first bar 144-1 of the switch 144, at a position at which it may be in contact with the first bar 144-1 of the switch 144 in a case where the circular gear 410 rotates in the second direction. In addition, the second bar 432 of the display apparatus 100, which is a bar disposed outside the circular gear 410, may be implemented in a form in which it is in contact with the second bar 144-2 of the switch 144, at a position at which it may be in contact with the second bar 144-2 of the switch 144 in a case where the circular gear 410 rotates in the first direction. Hereinafter, this will be described in detail with reference to FIG. 7B.

Referring to FIG. 7B, the switch 144 according to an embodiment of the disclosure may include the first bar 144-1 pressed in a state where the display 110 is in the first posture (that is, the portrait posture) and the second bar 144-2 pressed in a state where the display 110 is in the second posture (that is, the landscape posture).

Here, the first bar 144-1 may be pressed by a predetermined first angle by the first bar 431 of the display apparatus 100 while the display 110 is in the first posture. Here, the second bar 144-2 may be pressed by a predetermined second angle by the second bar 432 of the display apparatus 100 while the display 110 is in the second posture. Here, the predetermined first and second angles may be different from each other or be the same as each other.

To this end, information on a first driving signal for rotating the display 110 to the first posture from after the first bar 144-1 is pressed (that is, from after the switch 144 is turned on by the first bar 144-1) and information on a second driving signal for rotating the display 110 to the second posture from after the second bar 144-2 is pressed (that is, from after the switch 144 is turned on by the second bar 144-2) may be pre-stored in the display apparatus 100. Here, the information on the first driving signal may include information on a signal required to press the first bar 144-1 by the predetermined first angle, and the information the second driving signal may include information on a signal required to press the second bar 144-2 by the predetermined second angle.

Therefore, when the first bar 144-1 is pressed by the first bar 431 disposed outside the circular gear 410 according to the rotation of the display 110 from the second posture to the first posture, the processor 150 may rotate the display 110 to the first posture on the basis of the pre-stored information on the first driving signal from after the first bar 144-1 is pressed. Likewise, when the second bar 144-2 is pressed by the second bar 432 disposed outside the circular gear 410 according to the rotation of the display 110 from the first posture to the second posture, the processor 150 may rotate the display 110 to the second posture on the basis of the pre-stored information on the second driving signal from after the second bar 144-2 is pressed.

For example, when it is identified that a driving signal including ten pulses is required to rotate the display 110 to the first posture from after the first bar 144-1 is pressed, on the basis of the pre-stored information on the first driving signal, the processor 150 may sequentially output pulse signals to the motor 120 from after the first bar 144-1 is pressed until the ten pulses are counted.

Meanwhile, the information on the driving signal as described above may be stored by a calibration apparatus (not illustrated) in a step for calibration of the display 110, as described above.

As described above, in the disclosure, a horizontal state and a vertical state of the display apparatus may be precisely implemented using one switch 144.

When describing the contents described above in relation to the collision of the display 110, an operation of the display apparatus 100 is as follows.

First, when the display 110 is in the first posture, the first bar 144-1 of the switch 144 may be in a state where it is pressed by the predetermined first angle by the first bar 431 disposed outside the circular gear 410. That is, the switch 144 is in a turn-on state while the display 110 is in the first posture. In such a state, when an event for rotating the display 110 to the second posture occurs, the processor 150 may output the driving signal for rotating the display 110 in the first direction to the motor 120. In this case, the display 110 rotates in the first direction, and the switch 144 may therefore be turned off.

In addition, when it is identified that the display 110 collides with the object on the basis of the driving signal output to the motor 120 and the signal received from the sensor 130 while the display 110 rotates, the processor 150 may output the driving signal for rotating the display 110 in the second direction to the motor 120.

In this case, the display 110 may rotate in the second direction, and the first bar 144-1 of the switch 144 may therefore be pressed by the first bar 431 disposed outside the circular gear 410.

When the switch 144 in a turn-off state is turned on according to the rotation of the display 110 in the second direction (that is, when the first bar 144-1 is pressed by the first bar 431 disposed outside the circular gear 410), the processor 150 may output the driving signal for rotating the display 110 to the first posture to the motor 120 on the basis of the pre-stored information on the first driving signal from after the switch is turned on (that is, from after the first bar 144-1 is pressed).

That is, when the first bar 144-1 is pressed according to the rotation of the display 110 in the second direction, the processor 150 may identify a rotation angle by which the display 110 is to rotate from a point in time at which the first bar 143-1 is pressed on the basis of the pre-stored information on the driving signal and output pulse signals of which the number corresponds to the rotation angle to the motor, to allow the first bar 143-1 to be pressed by a degree by which the first bar 143-1 is pressed before a rotation event occurs.

Similarly, when an event for rotating the display 110 to the first posture occurs in a state where the display 110 is in the state of the second posture (that is, in a state where the second bar 144-2 is pressed), the processor 150 may output the driving signal for rotating the display 110 in the second direction to the motor 120.

Then, when it is identified that the display 110 collides with the object, the processor 150 may output the driving signal for rotating the display 110 in the first direction to the motor 120.

In addition, when the second bar 144-2 is pressed according to the rotation of the display 110 in the first direction, the processor 150 may output the driving signal for rotating the display 110 to the second posture to the motor 120 on the basis of the pre-stored information on the second driving signal from after the second bar 144-2 is pressed.

Therefore, in the disclosure, even in a case of returning the display 110 to an original state due to the collision, the display 110 may be disposed in a completely vertical state or a completely horizontal state using one switch.

Meanwhile, a case where the switch 144 includes the first bar 144-1 pressed by the first bar 431 of the display apparatus 100 while the display 110 is in the first posture (that is, the portrait posture) and the second bar 144-2 pressed by the second bar 432 of the display apparatus 100 while the display 110 is in the second posture (that is, the landscape posture) has been described hereinabove, but the switch 144 may include the first bar 144-1 pressed by the first bar 431 of the display apparatus 100 while the display 110 is in the second posture (that is, the landscape posture) and the second bar 144-2 pressed by the second bar 432 of the display apparatus 100 while the display 110 is in the first posture (that is, the portrait posture), according to an embodiment.

FIGS. 8A to 9C are views for describing operations of the display apparatus after collision according to an embodiment of the disclosure.

The processor 150 may stop the rotation of the display 110 and rotate the display 110 in the reverse direction, when it is identified that the display 110 and the object collide with each other.

In this case, the processor 150 may output an alarm for notifying the user of the collision. For example, referring to FIG. 8A, the processor 150 may display a message 810 "a display collides with an object. The display returns to an original state" through the display 110 or output a warning sound through a speaker.

Figure 8A:
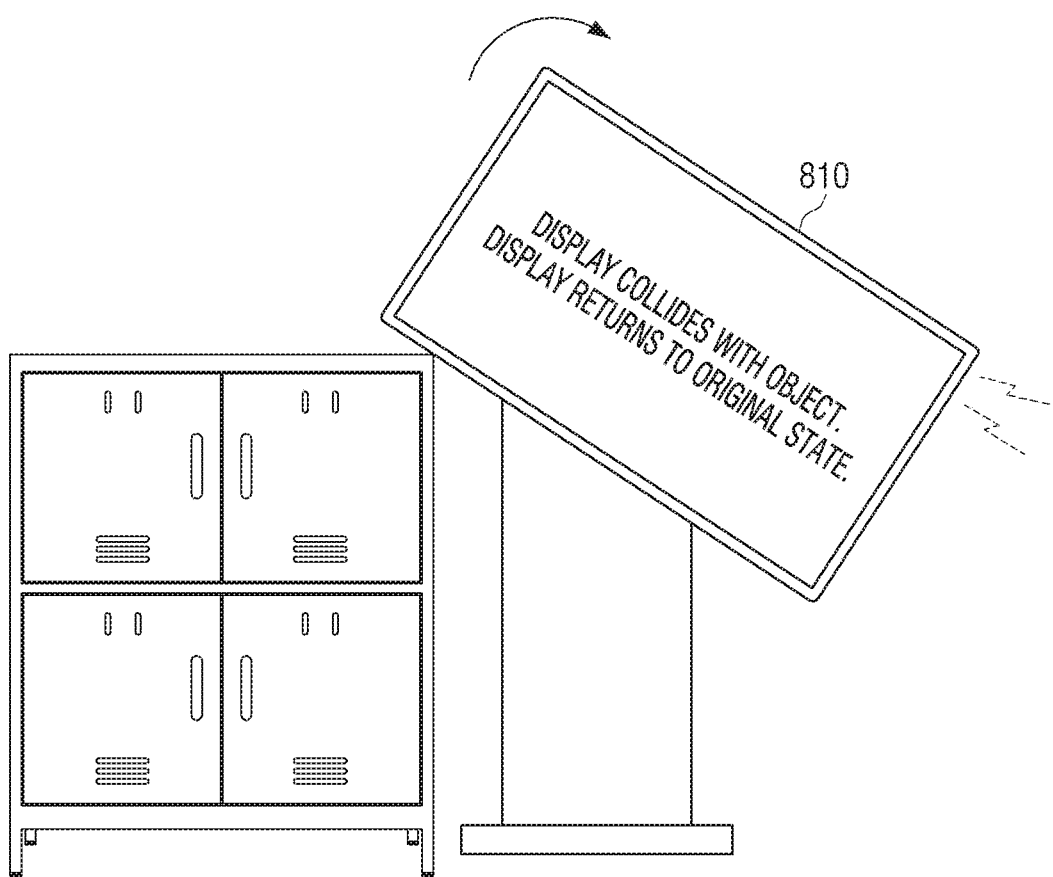
FIGS. 8A and 8B are views for describing operations of the display apparatus after collision according to an embodiment of the disclosure.
Figure 8B:
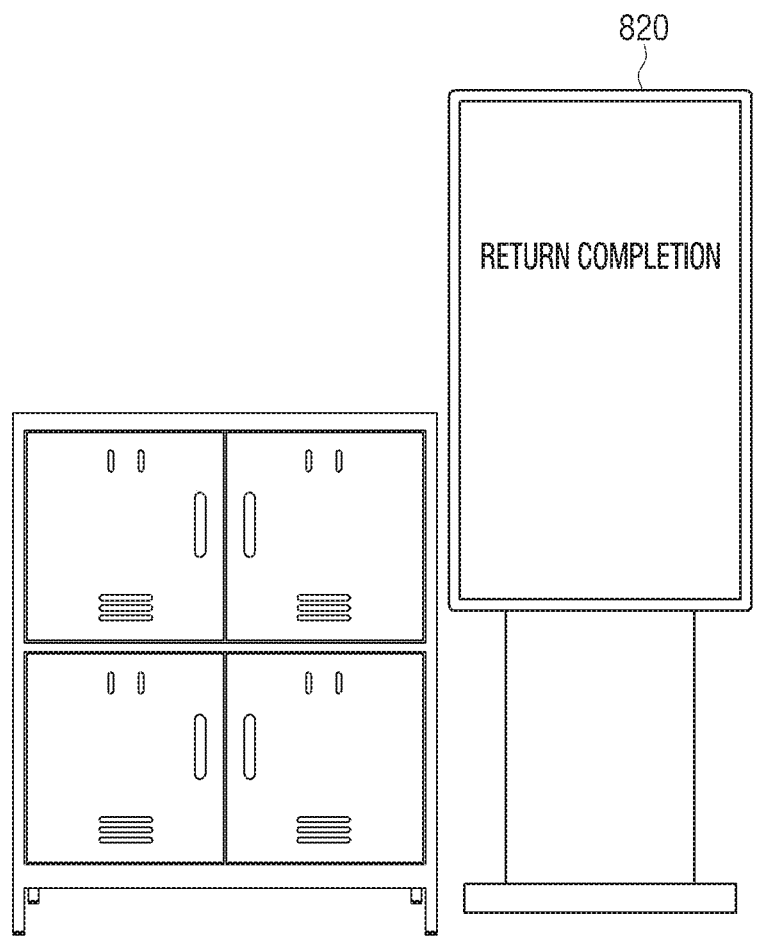

In addition, the processor 150 may display a message 820 "return completion" as illustrated in FIG. 8B, after it returns the display 110 to the original state.

Therefore, the user may recognize that the display 110 returns to the original state due to the collision between the display 110 and the object, and may move the display apparatus 100 or the surrounding object to another position.

Meanwhile, a case of stopping the rotation of the display 110 and automatically rotating the display 110 in the reverse direction when it is identified that the display 110 and the object collide with each other has been described hereinabove, but this is only an example.

Figure 9A:
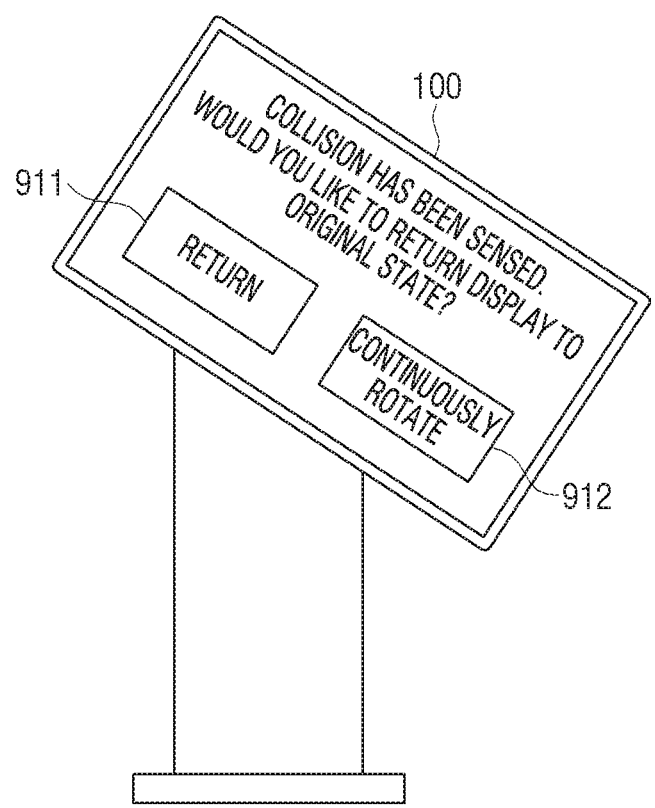
FIGS. 9A to 9C are views for describing operations of the display apparatus after collision according to an embodiment of the disclosure.

For example, referring to FIG. 9A, when it is identified that the display 110 and the object collide with each other, the processor 150 may stop the rotation of the display 110 and display a UI for receiving a user command for whether to continuously rotate the display 110 or to rotate the display 110 in the reverse direction on the display 110. For example, the processor 150 may display a message "collision has been sensed. Would you like to return a display to an original state?", a first UI 911 for returning the display to the original state, and a second UI 912 for continuously rotating the display, as illustrated in FIG. 9A.

Here, when a user command for selecting the first UI 911 for returning the display to the original state is received, the processor 150 may rotate the display 110 in the reverse direction to return the display 110 to the original state, and when a user command for selecting the second UI 912 for continuously rotating the display 110 is received, the processor 150 may continuously rotate the display 110.

Meanwhile, the processor 150 may also display a UI for receiving a user command for whether or not to maintain a current state when it is identified that the display 110 and the object collide with each other.

Figure 9B:
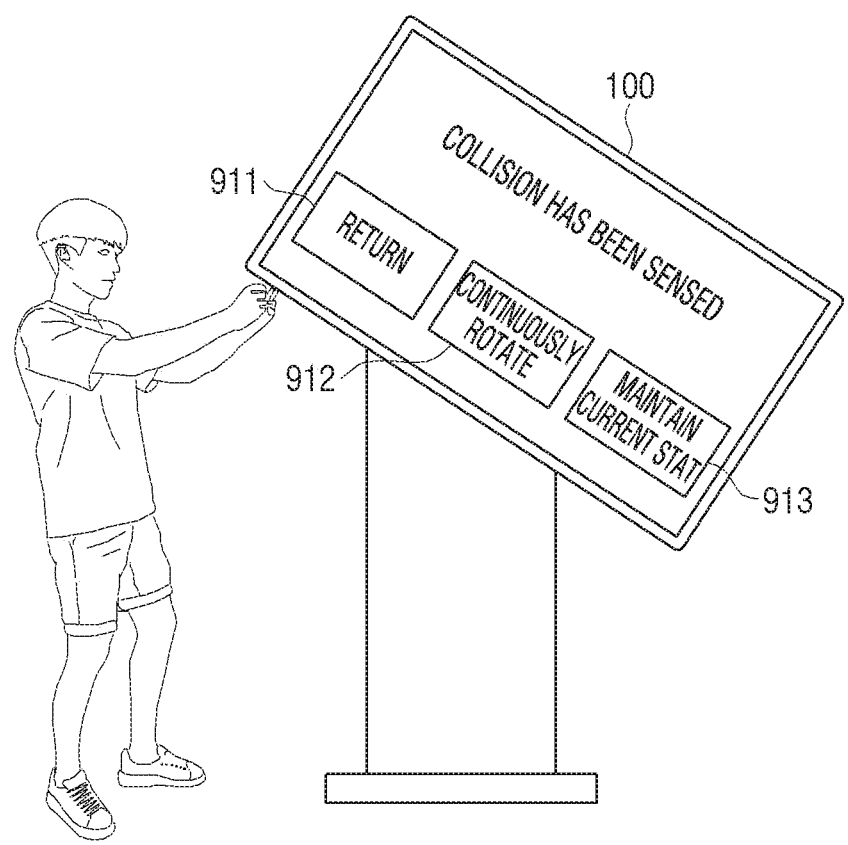

For example, referring to FIG. 9B, when it is identified that the display 110 and the object collide with each other, the processor 150 may stop the rotation of the display 110 and may display a message "collision has been sensed", a first UI 911 for returning the display to the original state, a second UI 912 for continuously rotating the display, and a third UI 913 for maintaining a current state.

Here, when a user command for selecting the third UI 913 for maintaining the current state is received, the processor 150 may display an image through the display 110 in a state at the time of stopping the rotation of the display.

This takes into consideration a situation where the user intentionally stops the rotation of the display 110 as illustrated in FIG. 9B. As an example, in a case where an image photographed in a state where a camera is inclined is reproduced, when the display 110 rotates by a predetermined angle, a user may intentionally stop the rotation of the display.

Meanwhile, when it is identified that the display 110 and the object collide with each other, the processor 150 may again rotate the display 110 when a predetermined time elapses after the rotation of the display 110 is temporarily stopped. As an example, when the collision between the display 110 and the object is sensed, the processor 150 may stop the rotation of the display 110 from the first posture to the second posture, and again rotate the display 110 after one second elapses. In addition, the processor 150 may rotate the display 110 to the second posture when the display 110 is rotated, and display at least one of the first UI, the second UI, or the third UI described above on the display 110 when the display 110 is not rotated.

Figure 9C:
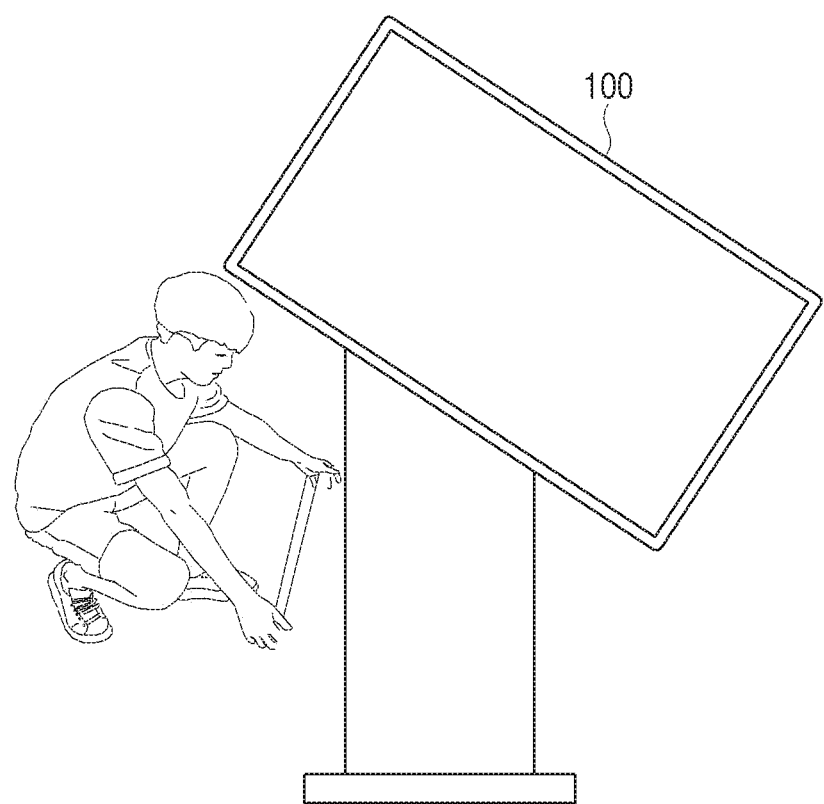

This takes into consideration a situation where collision of the display 110 temporarily occurs as the user moves to the surrounding of the display 110, as illustrated in FIG. 9C. For example, in a case where the user performs cleaning in the surrounding of the display 110, the display 110 may collide with the user while rotating. In this case, the rotation of the display 110 may be stopped, and the user feeling the collision may get out of the surrounding of the display 110. In such a case, in the disclosure, the display 110 may be again rotated without an additional user command.

FIG. 10 is a flowchart for describing rotation of the display apparatus according to an embodiment of the disclosure.

The display apparatus 100 may rotate the display 110 (S1020) when the rotation event for rotating the display 110 occurs (S1010).

Here, the rotation event may be an event in which a user command for rotating the display 110 is input, an event in which a predetermined time arrives, an event in which resolution of an image to be displayed and a posture of the display 110 do not match to each other, and the like.

Then, the display apparatus 100 may count pulses of the signal output by the sensor 130 and identify whether or not target pulses are counted (S1030), while the display 110 rotates.

For example, when the number of pulses that are to be output by the sensor 130 to rotate the display 110 from the first posture to the second posture is 800, if a rotation event for rotating the display 110 from the first posture to the second posture occurs, the display apparatus 100 may identify whether or not the number of pulses output by the sensor 130 is 800.

In addition, the display apparatus 100 may stop an output of the driving signal to the motor 120 when 800 pulses, which are target pulses, are counted. The reason is that in this case, it may be considered that the display 110 rotates from the first posture to the second posture.

On the other hand, when 800 pulses, which are the target pulses, are not counted, the display apparatus 100 may identify whether or not the number of pulses output by the sensor (for example, an encoder) and the number of pulses included in the driving signal output to the motor 120 correspond to each other (S1040).

In detail, the display apparatus 100 may identify whether or not a relationship between the number of pulse signals output to the motor 120 and the number of pulse signals output from the sensor 120 satisfies a predetermined relationship.

Here, the predetermined relationship may be determined on the basis of a ratio between the number of pulse signals required to rotate the display 110 from the first posture to the second posture and the number of pulse signals that are to be output from the sensor 120 depending on a rotation angle of the display 110 in a case where the display 110 rotates from the first posture to the second posture.

In addition, the display apparatus 100 may repeatedly identify whether or not 800 pulses, which are the target pulses, are counted when the relationship between the number of pulse signals output to the motor 120 and the number of pulse signals output from the sensor 120 satisfies the predetermined relationship.

On the other hand, the display apparatus 100 may identify that the display apparatus 100 collides with the object in a case where the relationship between the number of pulse signals output to the motor 120 and the number of pulse signals output from the sensor 120 does not satisfy the predetermined relationship.

In this case, the display apparatus 100 may stop the rotation (S1050), and rotate the display 110 in an opposite direction (S1060). That is, the display apparatus 100 may rotate the display 110 rotating in the first direction in the second direction.

Therefore, the display apparatus 100 may return the display 110 to a posture before the display 110 starts to rotate (S1070).

Figure 11:
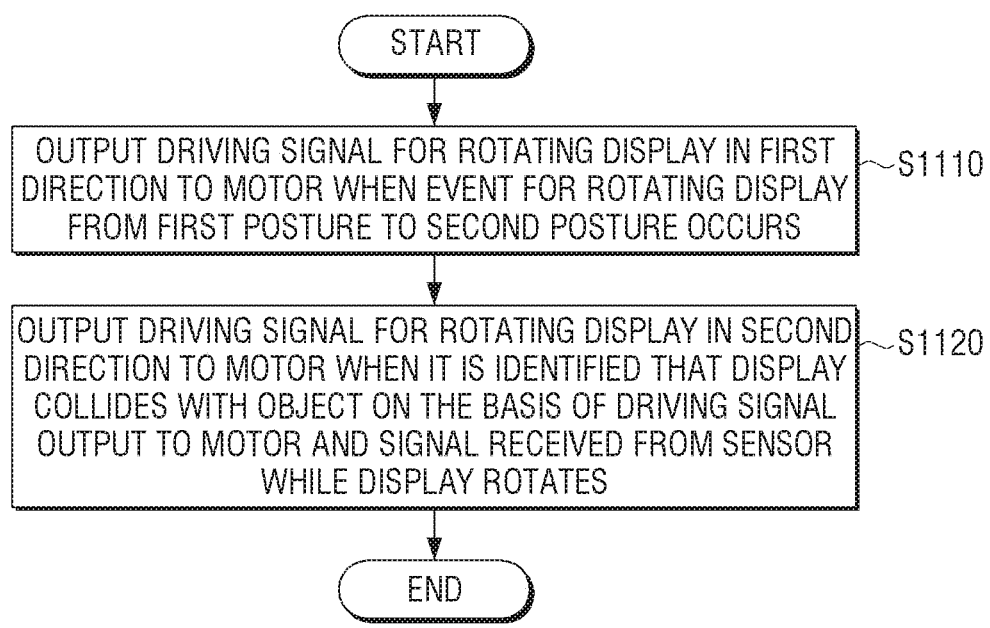
FIG. 11 is a flowchart for describing a control method of a display apparatus according to an embodiment of the disclosure.

FIG. 11 is a flowchart for describing a control method of a display apparatus according to an embodiment of the disclosure.

The display apparatus 100 may output the driving signal for rotating the display in the first direction to the motor when the event for rotating the display from the first posture to the second posture occurs (S1110). Here, the event for rotating the display from the first posture to the second posture may occur in a state in which the switch is pressed on the basis of the display of the first posture.

In detail, the display apparatus 100 may sequentially output the pulse signals for rotating the display in the first direction to the motor when the rotation event occurs. In addition, the display apparatus 100 may receive the pulse signals output by the sensor from the sensor outputting the pulse signal whenever the display rotates by a predetermined angle while the display rotates.

In addition, the display apparatus 100 may output the driving signal for rotating the display in the second direction to the motor when it is identified that the display collides with the object on the basis of the driving signal output to the motor and the signal received from the sensor while the display rotates (S1120).

In detail, the display apparatus 100 may identify that the display collides with the object in a case where the relationship between the number of pulse signals output to the motor and the number of pulse signals output from the sensor satisfies the predetermined relationship.

In addition, when the switch is pressed according to the rotation of the display in the second direction, the display apparatus 100 may output the driving signal for rotating the display to the first posture to the motor from after the switch is pressed.

Figure 12:
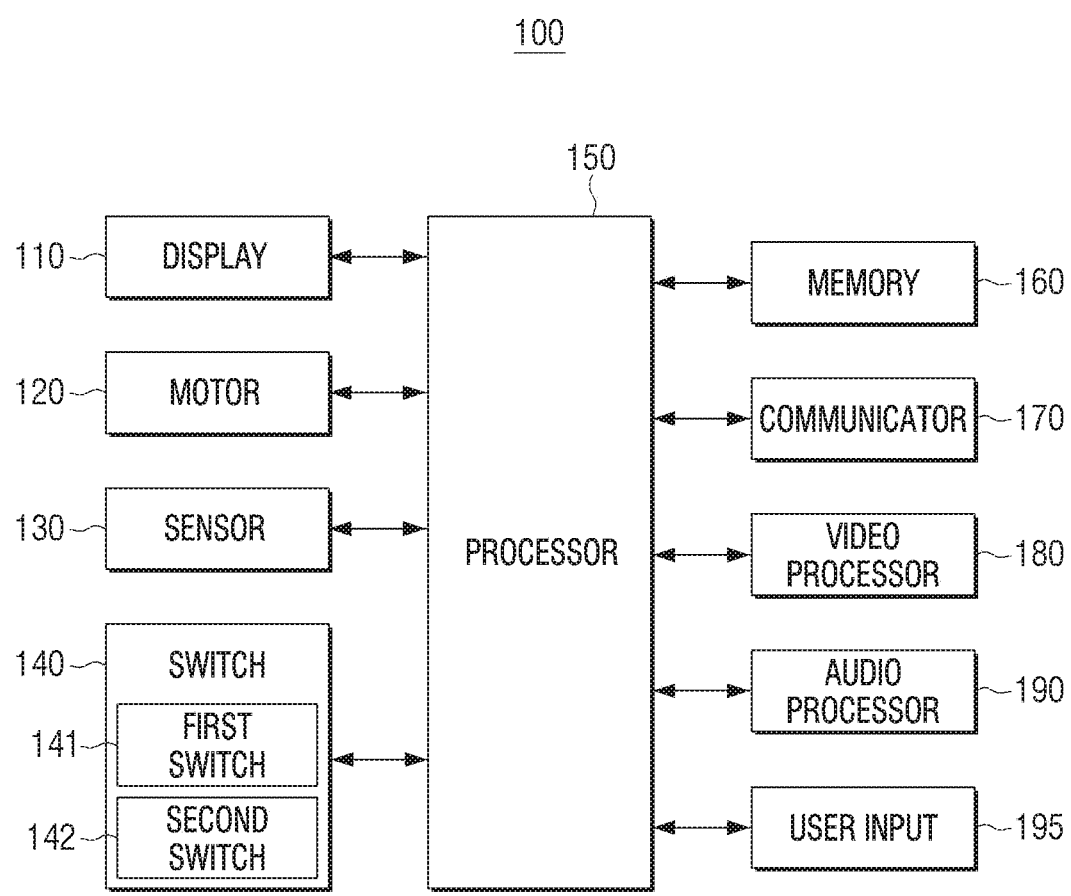
FIG. 12 is a detailed block diagram for describing the display apparatus according to an embodiment of the disclosure.

FIG. 12 is a detailed block diagram for describing the display apparatus according to an embodiment of the disclosure. Hereinafter, a description for portions overlapping those described above will be omitted or abbreviated.

Referring to FIG. 12, the display apparatus 100 according to an embodiment of the disclosure may include the display 110, the motor 120, the sensor 130, the switch 140, a memory 160, a communicator 170, a video processor 180, an audio processor 190, a user input 195, and the processor 150.

The memory 160 may store an operating system (OS) for controlling a general operation of components of the display apparatus 100 and commands or data related to the components of the display apparatus 100.

Therefore, the processor 150 may control a plurality of hardware or software components of the display apparatus 100 using various commands, data or the like stored in the memory 160, load and process a command or data received from at least one of other components to a volatile memory, and store various data in a non-volatile memory.

Particularly, the memory 160 may store the information on the driving signal for rotating the display 110 to the first posture from after the first switch 141 is pressed and the information on the driving signal for rotating the display 110 to the second posture from after the second switch 142 is pressed.

The communicator 170 may perform communication with various electronic apparatuses in various types of communication manners.

To this end, the communicator 170 may include at least one of a short-range wireless communication module (not illustrated) or a wireless local area network (LAN) communication module (not illustrated). Here, the short-range wireless communication module (not illustrated), which is a communication module wirelessly performing data communication with an electronic apparatus positioned in a short range, may be, for example, a Bluetooth module, a ZigBee module, a near field communication (NFC) module or the like. In addition, the wireless LAN communication module (not illustrated) is a module connected to an external network according to a wireless communication protocol such as wireless fidelity (WiFi), institute of electrical and electronics engineers (IEEE) or the like, to perform communication.

In addition, the communicator 170 may further include a mobile communication module accessing a mobile communication network according to various mobile communication protocols such as $3^{rd}$ generation (3G), $3^{rd}$ generation partnership project (3GPP), long term evolution (LTE), and the like, to perform communication. In addition, the communicator 170 may include at least one of wired communication modules (not illustrated) such as a universal serial bus (USB), IEEE 1394, RS-232, and the like, and may include a broadcasting receiving module receiving TV broadcasting.

Particularly, the communicator 170 may receive a user command for rotating the display apparatus 100 from an electronic apparatus such as a smartphone or the like. For example, in a case where the user command for rotating the display apparatus 100 is input through a screen of the smartphone, the communicator 170 may receive the user command for rotating the display apparatus 100 from the smartphone.

The display apparatus 100 may receive various broadcasting services, the Internet service and the like provided from the electronic apparatus through the communicator 170, may communicate with a peripheral smartphone, laptop computer or the like, and may be connected to a media device such as a sound bar or the like.

The video processor 180 is a component processing an image signal including an image frame received through the communicator 170. In the video processor 180, various kinds of image processing such as decoding, scaling, noise filtering, frame rate converting, resolution converting, and the like, for the image signal may be performed. The image frame processed as described above may be displayed on the display 110.

The audio processor 190 is a component processing an audio signal received through the communicator 170. In the audio processor 190, various kinds of processing such as decoding, amplifying, noise filtering, and the like, for the audio signal may be performed. The audio signal processed in the audio processor 190 may be output through an audio output (not illustrated).

The audio output (not illustrated), which is a component outputting various audio signals processed in the audio processor 190, alarms, or speech messages, may be implemented by a speaker or the like. Particularly, the audio output may output an alarm for notifying the user of collision when the display 110 collides with the object.

The user input 195 may receive various user commands input for controlling an operation of the display apparatus 100. Particularly, the user input 195 may receive a user command input for rotating the display 110.

To this end, the user input 195 may be implemented by various input devices that may control the display apparatus 100, such as various buttons, a touch sensor or the like. In addition, the user command may receive through an external remote controller, and the user input 195 may thus include a remote controller signal receiver.

The processor 150 controls a general operation of the display apparatus 100.

As described above, when it is identified that the display 110 that is rotating in the first direction collides with the object, the processor 150 may rotate the display 110 in the second direction.

In this case, the processor 150 may control a rotation speed of the display 110 during the rotation of the display 110 in the second direction to be relatively slower than that of the display 110 during the rotation of the display 110 in the first direction.

In detail, the processor 150 may output a signal having a frequency relatively lower than a frequency of a signal output to the motor 120 during the rotation of the display 110 in the first direction to the motor 120 during the rotation of the display 110 in the second direction.

By changing the rotation speed as described above, the user may easily recognize that current rotation of the display 110 is rotation for returning the display 110 to the original state due to the collision.

In addition, when the switch is pressed according to the rotation of the display 110 in the second direction, the processor 150 may rotate the display 110 to the first posture on the basis of the pre-stored information on the driving signal from after the switch is pressed.

In this case, when the switch is pressed according to the rotation of the display 110 in the second direction, the processor 150 may control a rotation speed of the display after the switch is pressed to be relatively slower than that of the display before the switch is pressed.

In detail, when the switch is pressed, the processor 150 may output a signal having a frequency relatively lower than that of a signal output to the motor 120 before the switch is pressed to the motor 120.

Therefore, in the disclosure, the display 110 may be more precisely disposed in a completely horizontal state or a completely vertical state.

Meanwhile, the processor 150 may control the motor 120 to rotate the display 110 on the basis of a first torque while the display 110 rotates to the first posture, and control the motor 120 to rotate the display 110 on the basis of a second torque relatively higher than the first torque while the display 110 rotates to the second posture.

Here, the first posture may be the portrait posture, and the second posture may be the landscape posture.

This takes into consideration of positions of various components included in the display apparatus 100. In detail, a plurality of components such as a heat dissipation plate, an LED driver and the like, may be positioned at a lower end of an internal space of the display apparatus 100. In this case, a relatively larger torque is required in a case of rotating the display from the landscape posture to the portrait posture than in a case of rotating the display from the portrait posture to the landscape posture.

In the case of rotating the display from the landscape posture to the portrait posture, when the display 110 rotates at the same torque as that in the case of rotating the display from the portrait posture to the landscape posture, due to shortage of the torque, the rotation of the display 110 may not be performed or noise may be generated even though the display 110 rotates.

In the disclosure, the abovementioned problem may be solved by rotating the display 110 at the relatively larger torque in the case of rotating the display from the landscape posture to the portrait posture than in the case of rotating the display from the portrait posture to the landscape posture.

Meanwhile, the processor 150 may identify whether or not the display collides with the object on the basis of signals received by various sensors, in addition to the driving signal output to the motor 120 and the signal received from the sensor 130, in identifying whether or not the display collides with the object.

As an example, when it is identified that the display 110 collides with the object on the basis of the driving signal output to the motor 120 and the signal received from the sensor 130, the processor 150 may identify an acceleration change amount of the display 110 measured by an acceleration sensor (not illustrated) at a point in time at which it is identified that the display 110 collides with the object. In addition, when it is identified that the acceleration change amount is a predetermined value or more, the processor 150 may identify that the collision actually occurs and stop the rotation of the display 110. Alternatively, the processor 150 identify an angular velocity change amount of the display 110 measured by a gyro sensor (not illustrated) at a point in time at which it is identified that the display 110 collides with the object. In addition, when it is identified that the acceleration change amount is 0, the processor 150 may identify that the collision actually occurs and stop the rotation of the display 110. That is, the processor 150 may stop application of the driving signal to the motor 120. In the disclosure, it may be accurately identified whether or not the display collides with the object by additionally considering the values measured by the various sensors.

Meanwhile, the methods according to the diverse embodiments of the disclosure described above may be implemented in a form of software or an application that may be installed in an existing display apparatus.

In addition, the methods according to the diverse embodiments of the disclosure described above may be implemented only by software upgrade or hardware upgrade for the existing display apparatus.

In addition, the diverse embodiments of the disclosure described above may also be performed through an embedded server provided in the display apparatus or a server disposed outside the display apparatus.

Meanwhile, a non-transitory computer readable medium in which a program sequentially performing the control method of a display apparatus according to the disclosure is stored may be provided.

The non-transitory computer readable medium is not a medium that stores data for a while, such as a register, a cache, a memory, or the like, but means a medium that semi-permanently stores data and is readable by an apparatus. In detail, the various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the embodiments of the disclosure have been illustrated and described hereinabove, the disclosure is not limited to the specific embodiments described above, but may be variously modified by those skilled in the art to which the disclosure pertains without departing from the scope and spirit of the disclosure as claimed in the claims. These modifications should also be understood to fall within the technical spirit and scope of the disclosure.

What is claimed is:

1. A display apparatus comprising:
a display;
a motor configured to rotate the display;
a sensor configured to sense a rotation of the display; and
a processor configured to based on an event for rotating the display from a first posture to a second posture occurring, output, to the motor, a driving signal including first pulse signals which is for rotating the display in a first direction,
identify whether the display is collided with an object while the display is rotating, based on the first pulse signals output to the motor and a signal, including second pulse signals, received from the sensor while the display is rotating, and
based on identifying that the display is collided with the object, output, to the motor, a driving signal for rotating the display in a second direction, opposite to the first direction.

2. The display apparatus as claimed in claim 1, wherein the processor is further configured to output the driving signal for rotating the display in the first direction by sequentially outputting, to the motor, the first pulse signals for rotating the display in the first direction, and
the sensor is configured to sense the rotation of the display and output, to the processor, the signal comprising the second pulse signals corresponding to the rotation of the display.

3. The display apparatus as claimed in claim 2, wherein the processor is further configured to perform a comparison between a number of first pulse signals output to the motor and a number of second pulse signals output from the sensor to identify whether the display is collided with the object while the display is rotating, and the comparison includes using a ratio between the number of first pulse signals required to rotate the display from the first posture to the second posture and the number of second pulse signals that are output from the sensor based on a rotation angle of the display in a rotation of the display from the first posture to the second posture.

4. The display apparatus as claimed in claim 1, further comprising a switch,
wherein the processor is further configured to, based on the switch being turned on according to the rotation of the display in the second direction, output, to the motor, first pulse signals corresponding to a rotation angle determined based on a degree by which the switch is pressed before the event occurs.

5. The display apparatus as claimed in claim 4, wherein the first posture is perpendicular to the second posture, and the switch includes:
a first switch pressed in a state where the display is in the first posture; and
a second switch pressed in a state where the display is in the second posture.

6. The display apparatus as claimed in claim 5, wherein the processor is further configured to:
based on the first switch being pressed according to the rotation of the display in the second direction after a first event for rotating the display from the first posture to the second posture occurs, output, to the motor, a first driving signal for rotating the display to the first posture after the first switch is pressed, and
based on the second switch being pressed according to the rotation of the display in the first direction after a second event for rotating the display from the second posture to the first posture occurs, output, to the motor, a second driving signal for rotating the display to the second posture after the second switch is pressed, and
wherein the first event occurs in a state where the first switch is pressed based on the display of the first posture, and the second event occurs in a state where the second switch is pressed based on the display of the second posture.

7. The display apparatus as claimed in claim 4, wherein the processor is further configured to, based on the switch being pressed according to the rotation of the display in the second direction, control a rotation speed of the display after the switch is pressed to be slower than that of a rotation speed of the display before the switch is pressed, so that a rotation of the display slows as the display approaches the first posture or the second posture.

8. The display apparatus as claimed in claim 1, wherein the processor is further configured to control a rotation speed of the display during the rotation of the display in the second direction to be slower than a rotation speed of the display during the rotation of the display in the first direction.

9. The display apparatus as claimed in claim 1, wherein, based on identifying that the display is collided with the object, the processor is further configured to stop the rotation of the display and display a user interface for receiving a user input to reverse the rotation of the display to return to a previous posture and a user interface for receiving a user input to continue the rotation of the display to the intended posture.

10. The display apparatus as claimed in claim 1, wherein the processor is further configured to:
control the motor to rotate the display with a first torque while the display rotates from the first posture to the second posture, and
control the motor to rotate the display with a second torque higher than the first torque while the display rotates from the second posture to the first posture.

11. A method comprising:
based on an event for rotating a display of a display apparatus from a first posture to a second posture occurring, outputting, to a motor of the display apparatus, a driving signal including first pulse signals which is for rotating the display in a first direction;
identifying whether the display is collided with an object while the display is rotating, based on the first pulse signals output to the motor and a signal, including second pulse signals, received from a sensor of the display apparatus while the display is rotating; and
based on identifying that the display is collided with the object, outputting, to the motor, a driving signal for rotating the display in a second direction, opposite to the first direction.

12. The method as claimed in claim 11, wherein the outputting of the driving signal for rotating the display in the first direction includes sequentially outputting, to the motor, the first pulse signals for rotating the display in the first direction, and
the sensor is configured to sense the rotation of the display and output the signal comprising the second pulse signals corresponding to the rotation of the display.

13. The method as claimed in claim 12, wherein the identifying whether the display is collided with the object includes performing a comparison between a number of first pulse signals output to the motor and a number of second pulse signals output from the sensor to identify whether the display is collided with the object while the display is rotating, and
the comparison includes using a ratio between the number of first pulse signals required to rotate the display from the first posture to the second posture and the number of second pulse signals that are output from the sensor based on a rotation angle of the display in a rotation of the display from the first posture to the second posture.

14. The method as claimed in claim 11, further comprising, based on a switch of the display apparatus being turned on according to the rotation of the display in the second direction, outputting, to the motor, a driving signal for rotating the display to the first posture after the switch is turned on,
wherein the outputting the driving signal for rotating the display to the first posture includes outputting, to the motor, first pulse signals corresponding to a rotation angle determined based on a degree by which the switch is pressed before the event occurs.

15. The method as claimed in claim 14, wherein the first posture is perpendicular to the second posture, and the switch includes:
a first switch pressed in a state where the display is in the first posture; and
a second switch pressed in a state where the display is in the second posture.

16. The method as claimed in claim 15, further comprising:
based on the first switch being pressed according to the rotation of the display in the second direction after a first event for rotating the display from the first posture to the second posture occurs, outputting, to the motor, a first driving signal for rotating the display to the first posture after the first switch is pressed; and
based on the second switch being pressed according to the rotation of the display in the first direction after a second event for rotating the display from the second posture to the first posture occurs, output, to the motor, outputting, to the motor, a second driving signal for rotating the display to the second posture after the second switch is pressed, and wherein the first event occurs in a state where the first switch is pressed based on the display of the first posture, and the second event occurs in a state where the second switch is pressed based on the display of the second posture.

17. The method as claimed in claim 14, further comprising based on the switch being pressed according to the rotation of the display in the second direction, controlling a rotation speed of the display after the switch is pressed to be slower than that of a rotation speed of the display before the switch is pressed, so that a rotation of the display slows as the display approaches the first posture or the second posture.

18. The method as claimed in claim 11, further comprising controlling a rotation speed of the display during the rotation of the display in the second direction to be slower than that of a rotation speed of the display during the rotation of the display in the first direction.

19. The method as claimed in claim 11, further comprising, based on identifying that the display is collided with the object, stopping the rotation of the display and displaying a user interface object for receiving a user input to reverse the rotation of the display to return to a previous posture and a user interface for receiving a user input to continue the rotation of the display to the intended posture.

20. The method as claimed in claim 11, further comprising:

controlling the motor to rotate the display with a first torque while the display rotates from the first posture to the second posture, and controlling the motor to rotate the display with a second torque higher than the first torque while the display rotates from the second posture to the first posture.

\* \* \* \* \*